(12) United States Patent
O'Hara et al.

(10) Patent No.: US 10,195,948 B2
(45) Date of Patent: Feb. 5, 2019

(54) CONTROLLING CHARGE ON A LITHIUM BATTERY OF A UTILITY VEHICLE

(71) Applicant: Textron Innovations Inc., Providence, RI (US)

(72) Inventors: Luke Anthony O'Hara, Augusta, GA (US); Arthur James Harvey, Beech Island, SC (US); John Ledden, Augusta, GA (US); Russell William King, Evans, GA (US)

(73) Assignee: Textron Innovations Inc., Providence, RI (US)

( * ) Notice: Subject to any disclaimer, the term of this patent is extended or adjusted under 35 U.S.C. 154(b) by 52 days.

(21) Appl. No.: 15/452,079

(22) Filed: Mar. 7, 2017

(65) Prior Publication Data

US 2018/0257492 A1 Sep. 13, 2018

(51) Int. Cl.
*H02J 7/00* (2006.01)
*B60L 11/18* (2006.01)
*H01M 10/0525* (2010.01)
*H01M 10/42* (2006.01)
*H01M 10/44* (2006.01)

(52) U.S. Cl.
CPC ....... *B60L 11/1809* (2013.01); *B60L 11/1862* (2013.01); *H01M 10/0525* (2013.01); *H01M 10/425* (2013.01); *H01M 10/44* (2013.01); *H02J 7/007* (2013.01); *H02J 7/0047* (2013.01); *H02J 7/0068* (2013.01); *B60L 2200/22* (2013.01); *H01M 2010/4271* (2013.01); *H01M 2220/20* (2013.01)

(58) Field of Classification Search
CPC .................................................. B60L 11/1862

USPC ......................................................... 320/134
See application file for complete search history.

(56) References Cited

U.S. PATENT DOCUMENTS

| 5,934,051 | A | 8/1999 | Hahn |
| 6,885,535 | B2 | 4/2005 | Hummert et al. |
| 7,332,881 | B2 | 2/2008 | Clark et al. |
| 7,471,064 | B2 * | 12/2008 | Sobue ................... H02J 7/0026 320/116 |

(Continued)

OTHER PUBLICATIONS

Garia, "Introducing the New Garia Golf", http://www.garia.com/news/introducing-the-new-garia-golf/, Sep. 15, 2016.

*Primary Examiner* — Yalkew Fantu
(74) *Attorney, Agent, or Firm* — BainwoodHuang

(57) ABSTRACT

A technique controls charge on a lithium battery of a utility vehicle. The technique involves operating electronic circuitry of the utility vehicle in a normal operating mode in which the electronic circuitry charges the lithium battery to a normal charge level. The technique further involves, after operating the electronic circuity in the normal operating mode, transitioning the electronic circuitry from the normal operating mode to a storage mode in which the electronic circuitry is configured to set an amount of charge on the lithium battery to within a predefined storage range (or level) which is lower than the normal charge level. The technique further involves, in response to transitioning the electronic circuitry, adjusting the amount of charge on the lithium battery from an initial charge level which is outside the predefined storage range to an adjusted charge level which is within the predefined storage range.

22 Claims, 13 Drawing Sheets

(56) References Cited

U.S. PATENT DOCUMENTS

| | | |
|---|---|---|
| 7,560,882 B2 | 7/2009 | Clark et al. |
| 7,778,746 B2 | 8/2010 | McLeod et al. |
| 7,800,345 B2 | 9/2010 | Yun et al. |
| 7,825,616 B2 | 11/2010 | Clark et al. |
| D652,349 S | 1/2012 | Kristensen |
| 8,120,291 B2 | 2/2012 | Clark et al. |
| 8,596,391 B2 | 12/2013 | Kshatriya |
| 8,604,749 B2 | 12/2013 | Kwag et al. |
| 8,714,572 B1 | 5/2014 | Singletary et al. |
| 9,050,899 B2 | 6/2015 | Seol |
| 9,190,782 B2 | 11/2015 | King et al. |
| 9,199,546 B2 | 12/2015 | King |
| 9,225,183 B2 | 12/2015 | King |
| 9,371,067 B2 | 6/2016 | Dao et al. |
| 9,387,775 B2 | 7/2016 | Baek et al. |
| 9,436,261 B2 | 9/2016 | Yun |
| 9,508,982 B2 | 11/2016 | Kim et al. |
| 9,553,460 B2 | 1/2017 | Dao et al. |
| 9,592,743 B2 | 3/2017 | Haug |
| 9,595,847 B2 | 3/2017 | Dao et al. |
| 9,806,341 B2 | 10/2017 | Lee et al. |
| 9,806,545 B2 | 10/2017 | Fink |
| 2005/0194931 A1* | 9/2005 | Sobue .................. H02J 7/0026 320/116 |
| 2009/0055157 A1* | 2/2009 | Soffer ................. G06F 15/7864 703/27 |
| 2010/0121513 A1* | 5/2010 | Itoh ........................ B60K 6/365 701/22 |
| 2013/0241502 A1 | 9/2013 | Sowden |
| 2013/0249493 A1* | 9/2013 | Kim ........................ B60L 3/003 320/134 |
| 2014/0277887 A1* | 9/2014 | Slattery ................. B60L 1/003 701/22 |
| 2015/0191098 A1* | 7/2015 | Chang ................ B60L 11/1862 701/22 |
| 2017/0267107 A1* | 9/2017 | Miyashita ............... B60L 11/02 |

* cited by examiner

CONTROLLING CHARGE ON A LITHIUM BATTERY OF A UTILITY VEHICLE

BACKGROUND

Some conventional electric vehicles run on electric power from lead acid batteries. When the remaining charge on a lead acid battery of such a conventional electric vehicle is low, the vehicle operator may recharge the lead acid battery from an external power source (e.g., street power).

If the vehicle operator plans to store the conventional electric vehicle for a long amount of time (e.g., for a few weeks or more), the vehicle operator typically charges the lead acid battery of the conventional electric vehicle to full saturation. Since lead acid battery sulfation occurs when the lead acid battery is deprived of a full charge, such charging to full saturation minimizes sulfation as well as preserves (i) lead acid battery capacity, (ii) shorter lead acid battery charging times, and (iii) longer lead acid battery life.

SUMMARY

It should be understood that there are deficiencies to the above-described conventional electric vehicles which run on electric power from lead acid batteries. For example, lead acid batteries are inferior to lithium batteries from certain perspectives. Along these lines, lead acid batteries tend to weigh more, have shorter cycle life, and provide less consistent voltage, among other things.

Moreover, the lead acid battery of a conventional electric vehicle cannot simply be replaced with a lithium battery and then maintained in the same manner as a lead acid battery. Rather, lithium batteries may lose capacity if stored at a high temperature and at a high state of charge for a long amount of time. In some situations, the lithium batteries may physically expand due to gas release and sustain permanent damage if stored at a high temperature and at a high state of charge.

To preserve lithium battery capacity and avoid gas release, a lithium-battery-powered electric vehicle should be stored with its lithium battery charged to less than a high state of charge. However, it should be understood that the task of removing charge from a lithium battery of an electric vehicle to a desirable storage charge level may be an inexact and labor intensive process. Along these lines such activity may involve operating separate discharging equipment or driving the electric vehicle to discharge the lithium battery. Such work is time consuming, error prone, and iterative in nature. Moreover, such work may be compounded if the lithium battery of more than one electric vehicle is to be processed (e.g., if a fleet of electric vehicles is to be processed).

Improved vehicle storage techniques are directed to adjusting states of charge of lithium batteries of utility vehicles to predefined charge ranges (or levels) which are lower than normal charge levels that the lithium batteries charge to during normal operation (e.g., a mode used for periods of normal vehicle usages versus periods of storage). Along these lines, if the normal charge level is 100% or 95% of the standard full charge level of the lithium batteries, the adjusted state of charge may be between 20% and 50%. Such techniques may be used when storing utility vehicles for extended periods of time (e.g., more than a couple of weeks, a month, etc.). In some situations, such activities may be performed in an automated manner in response to storage commands provided by human users. With such techniques, the capacities of the lithium batteries are preserved and the chances of releasing gas from the lithium batteries are reduced.

One embodiment is directed to a control system to control state of charge of a lithium battery of a utility vehicle. The control system includes a lithium battery configured to provide lithium battery power to a set of electrical loads of the utility vehicle, and electronic circuitry coupled with the lithium battery. The electronic circuitry is configured to operate in a normal operating mode in which the electronic circuitry charges the lithium battery of the utility vehicle to a normal charge level. The electronic circuitry is further configured to, after operating in the normal operating mode, transition from the normal operating mode to a storage mode in which the electronic circuitry is configured to set an amount of charge on the lithium battery to within a predefined storage range that is lower than the normal charge level. The electronic circuitry is further configured to, in response to transitioning from the normal operating mode to the storage mode, adjust the amount of charge on the lithium battery from an initial charge level which is outside the predefined storage range to an adjusted charge level which is within the predefined storage range.

In some arrangements, the electronic circuitry, when transitioning from the normal operating mode to the storage mode, is configured to receive, as user input, a storage mode command from a user input device operated by a user, and automatically move the electronic circuitry from the normal operating mode to the storage mode in response to the storage mode command. The storage mode command may come from a dedicated mode control switch, a transmission switch, other types of switches, etc. The storage mode command also may come from an external apparatus such as a phone, a tablet, a laptop computer, a desktop computer or workstation, or other computing device which couples with the electronic circuitry (e.g., via a physical cable such as USB, wireless communications, or other type of data port).

Another embodiment is directed to a utility vehicle which includes a utility vehicle body, a set of electrical loads supported by the utility vehicle body, and a control system supported by the utility vehicle body and coupled with the set of electrical loads. The control system includes a lithium battery configured to provide lithium battery power to the set of electrical loads, and electronic circuitry coupled with the lithium battery. The electronic circuitry is configured to:

(A) operate in a normal operating mode in which the electronic circuitry charges the lithium battery of the utility vehicle to a normal charge level, (B) after operating in the normal operating mode, transition from the normal operating mode to a storage mode in which the electronic circuitry is configured to set an amount of charge on the lithium battery to within a predefined storage range which is lower than the normal charge level, and (C) in response to transitioning from the normal operating mode to the storage mode, adjust the amount of charge on the lithium battery from an initial charge level which is outside the predefined storage range to an adjusted charge level which is within the predefined storage range.

Yet another embodiment is directed to a method of controlling charge on a lithium battery of a utility vehicle. The method includes:

(A) operating electronic circuitry of the utility vehicle in a normal operating mode in which the electronic circuitry charges the lithium battery of the utility vehicle to a normal charge level;

(B) after operating the electronic circuitry in the normal operating mode, transitioning the electronic circuitry from the normal operating mode to a storage mode in which the electronic circuitry is configured to set an amount of charge on the lithium battery to within a predefined storage range which is lower than the normal charge level; and (C) in response to transitioning the electronic circuitry from the normal operating mode to the storage mode, adjusting the amount of charge on the lithium battery from an initial charge level which is outside the predefined storage range to an adjusted charge level which is within the predefined storage range.

Other embodiments are directed to higher and lower level systems, assemblies, apparatus, processing circuits, etc. Some embodiments are directed to various processes, electronic components and circuitry which are involved in controlling charge on a lithium battery of a utility vehicle.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

An improved vehicle storage technique is directed to controlling electric charge on a lithium battery of a utility vehicle. In particular, such a technique adjusts state of charge of the lithium battery to a predefined charge range (or level) which is lower than a normal charge level that the lithium battery charges to during normal operation. For example, the adjusted state of charge may be within a range of 20%-50% of a standard full charge level of the lithium battery. Such a technique may be used when storing the utility vehicle for an extended period of time (e.g., for more than a couple of weeks, for a month, etc.). In some situations, such charge control activity may be performed in an automated manner in response to a storage command provided by a human user. With such a technique, the capacity of the lithium battery is preserved and the possibility of damaging the lithium battery is reduced.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
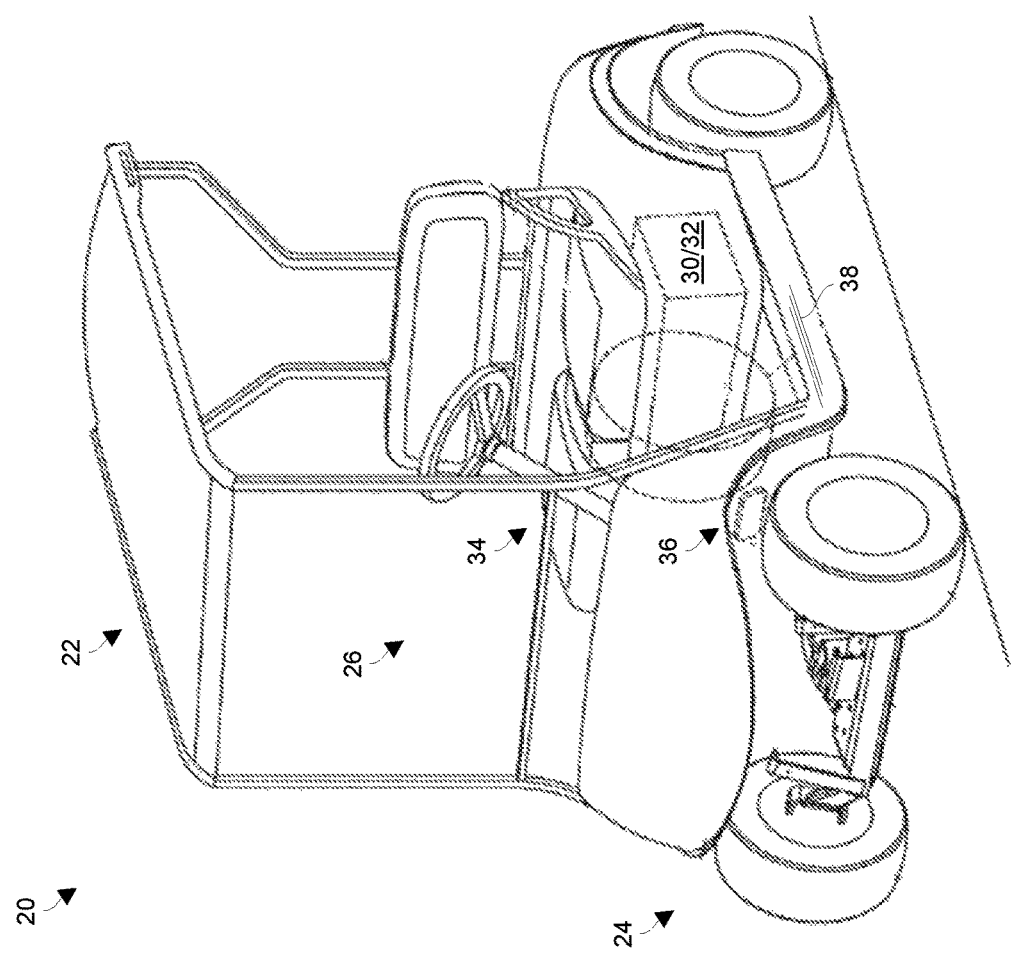
FIG. 1 is a perspective view of an example utility vehicle which controls electrical access to a lithium battery.

FIG. 1 shows an example utility vehicle 20 which controls state of charge of a lithium battery. The utility vehicle 20 includes a utility vehicle body 22 (e.g., a chassis, a frame, etc.), a set of tires (or wheels) 24, and a motion control system 26. It should be understood that the utility vehicle 20 has the form factor of a golf car by way of example only and that other form factors are suitable for use as well such as those of personal transport vehicles, food and beverage vehicles, hospitality vehicles, all-terrain vehicles (ATVs), utility task vehicles (UTVs), motorcycles, scooters, vehicles for specialized applications, as well as other lightweight vehicles and utility vehicles.

The motion control system 26 controls vehicle movement such as drive provided by the set of tires 24, speed control, braking, and so on thus enabling the utility vehicle 20 to perform useful work. The motion control system 26 of the illustrated embodiments includes, among other things, a motor (or traction control) system 30, a lithium battery system 32, and additional components 34 such as a set of user controls 36 (e.g., a foot pedal, a keyed switch, a maintenance switch, etc.) and cabling 38. As will be explained in further detail below, the utility vehicle 20 runs on power from a lithium battery and is equipped with a sleep/wakeup feature that automatically disconnects the lithium battery in response to certain timeout conditions thus preventing the lithium battery from further discharging.

During operation, the motion control system 26 controls state of charge of the lithium battery. In particular, electronic circuitry of the motion control system 26 is capable of transitioning between a normal operating mode and a storage mode. When the electronic circuitry operates in the normal operating mode, if the user connects an external charger to the utility vehicle 20, the electronic circuitry charges the lithium battery to a normal charge level (e.g., full capacity, 95% of full capacity, 90% of full capacity, etc.). In some embodiments, the value for the normal charge level is an adjustable parameter that can be modified based on a variety of factors (e.g., temperature, humidity, typical amount of usage time before recharging, etc.).

Normal operating mode is well suited for situations in which the user operates the utility vehicle 20 regularly so that the lithium battery does not remain at a high state of charge for an excessive period of time (e.g., for more than two weeks, for more than a month, etc.) where the high state of charge could permanently degrade lithium battery capacity or where the lithium battery could sustain damage (e.g., expansion due to gas release).

If the user wishes to store the utility vehicle 20 for an extended period of time, the user may transition the electronic circuitry of the motion control system 26 to a storage mode (e.g., by providing a storage mode command to the electronic circuitry while the electronic circuitry is in the normal operating mode). When the electronic circuitry operates in the storage mode, the electronic circuitry adjusts the amount of charge on the lithium battery from an initial charge level which is outside a predefined storage range to an adjusted charge level which is within the predefined storage range if necessary. For example, if the initial charge level is higher than the predefined storage range such as in a fully charged state, the electronic circuitry discharges the lithium battery to the adjusted charge level. Alternatively, if the initial charge level is lower than the predefined storage range, the electronic circuitry charges the lithium battery (e.g., following connection of an external charger to the utility vehicle) to the adjusted charge level. If the initial charge level is within bounds of the predefined storage range when the electronic circuitry enters the storage mode, the electronic circuitry maintains the charge level within the predefined storage range.

Once the charge level of the lithium battery is within the predefined storage range (e.g., within a range of 20%-50% of full capacity), the electronic circuitry goes to sleep thus enabling the lithium battery to remain for an extended period of time (e.g., for a few weeks, for a month or more, etc.) at a healthy state of charge in which battery capacity is well preserved and the possibility of damaging the lithium battery (e.g., due to gas release) is reduced. In some embodiments, the value for the adjusted charge level is an adjustable parameter that can be modified based on a variety of factors (e.g., expected storage temperature, expected storage humidity, the planned amount of storage time, the planned amount of usage time following storage but before recharging, etc.).

After the electronic circuitry of the utility vehicle 20 goes to sleep, the user may wake up the electronic circuitry of the motion control system 26 at any time (e.g., via turning a key switch). In accordance with some embodiments, the electronic circuitry wakes up in the normal operating mode.

Then, if the user subsequently connects an external charger to the utility vehicle 20, the electronic circuitry charges the lithium battery to the normal charge level. Further details will now be provided with reference to FIGS. 2 and 3.

Figure 2:
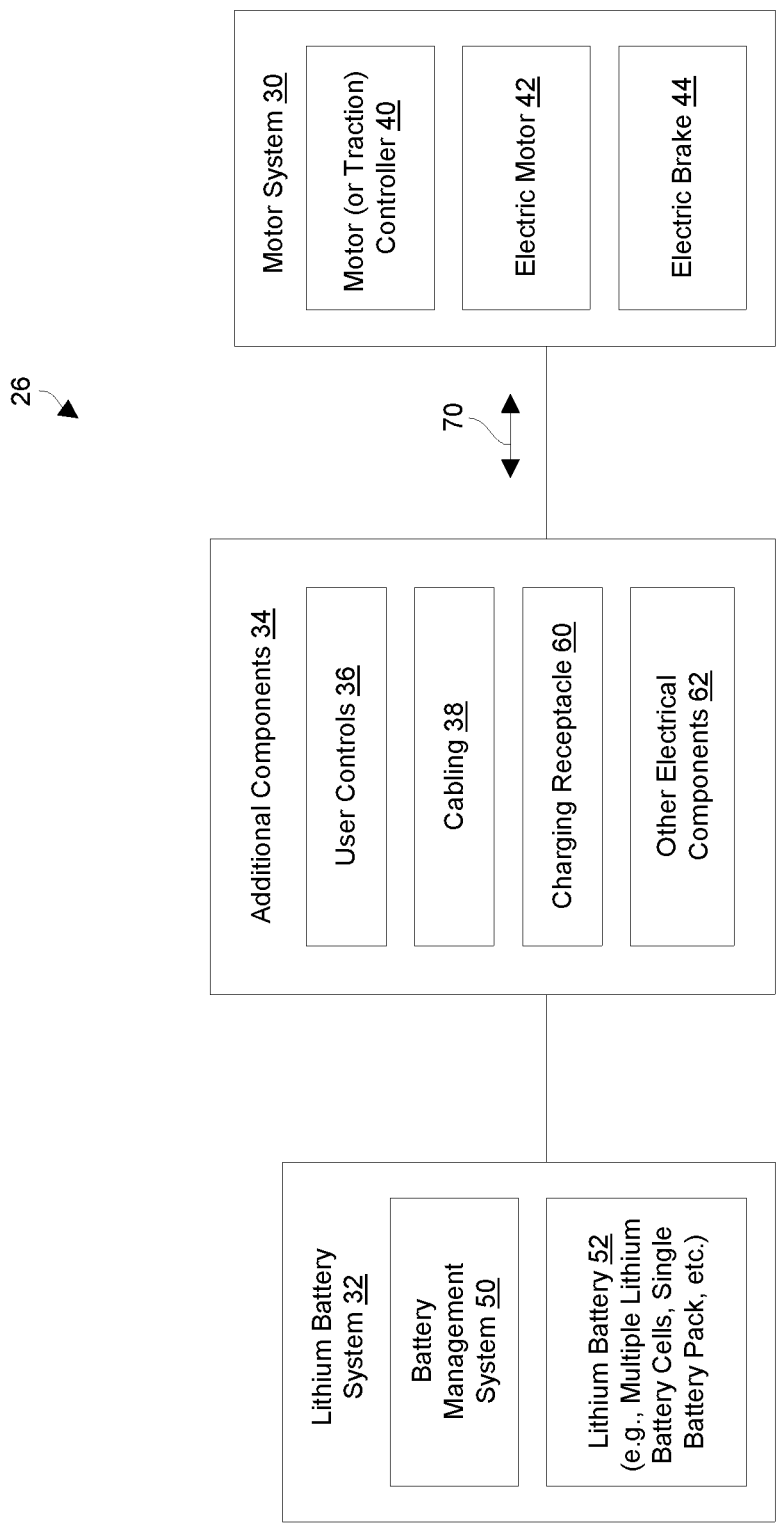
FIG. 2 is a block diagram of particular systems and components of the utility vehicle of FIG. 1 in accordance with some example embodiments.
Figure 3:
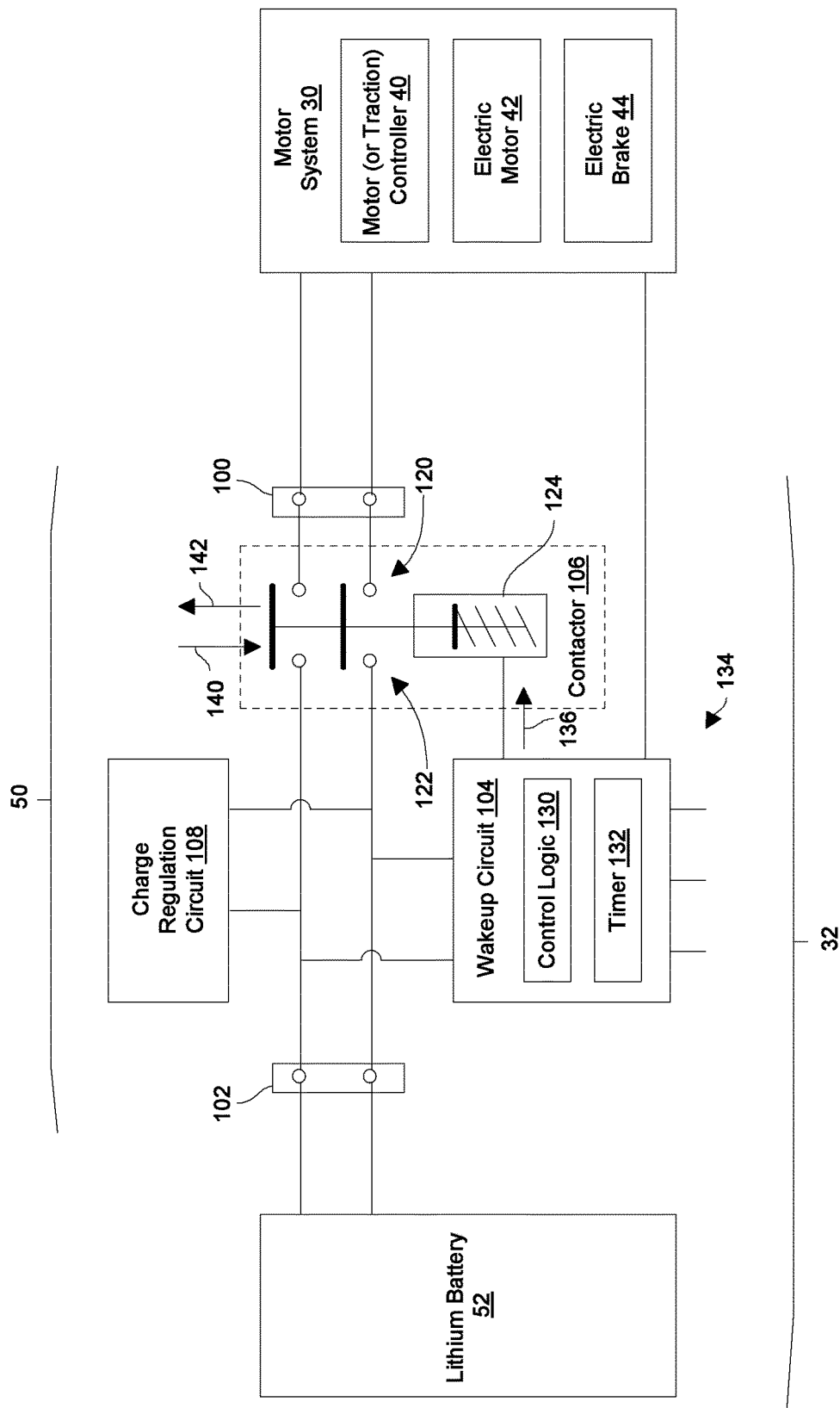
FIG. 3 is a block diagram of additional details of the utility vehicle of FIG. 1 in accordance with some example embodiments.

FIGS. 2 and 3 show particular details of the motion control system 26 of the utility vehicle 20 (FIG. 1) of some example embodiments. FIG. 2 shows certain general components of the motion control system 26 of some embodiments and how these components are related. FIG. 3 shows particular lower level details of the motion control system 26 in accordance with some embodiments.

As shown in FIG. 2, the motor system 30 includes a motor controller (or, more generally, a traction controller) 40, an electric motor 42 which is linked to the set of tires 24 (FIG. 1), and an electric brake 44 coupled with the electric motor 42. The motor controller 40 of some embodiments controls delivery of stored electric power from the lithium battery system 32 to the electric motor 42 which ultimately turns at least some of the tires 24 to move the utility vehicle 20. Additionally, the motor controller 40 of some embodiments controls delivery of regenerative power from the electric motor 42 to recharge the lithium battery system 32 (e.g., during braking, while the utility vehicle 20 coasts downhill without any pedal depression, etc.).

The electric brake 44 is constructed and arranged to provide mechanical resistance which inhibits turning of the electric motor 42 when the electric brake 44 is unpowered, and remove the mechanical resistance to release the electric motor 42 thus allowing the electric motor 42 to turn when the electric brake 44 receives power. Accordingly, in some embodiments, when the utility vehicle 20 sits idle (e.g., the utility vehicle 20 is awake but a user is not pressing on the accelerator pedal, the utility vehicle 20 is turned off, etc.), the electric brake 44 remains engaged and the utility vehicle 20 sits in a parked state.

The lithium battery system 32 includes a battery management system (BMS) 50 and a lithium battery 52. The BMS 50 controls electrical access to the lithium battery 52. Additionally, as will be explained in further detail shortly, the BMS 50 of some embodiments responds to various events such as sleep events (e.g., timeouts) to prevent excessive discharging of the lithium battery 52 thus safeguarding the lithium battery 52 from becoming over discharged. In some embodiments, the BMS 50 responds to other events as well such as wakeup events (e.g., actuation of the user controls 36), charging situations, fault conditions, and so on to properly and safely control charging and discharging of the lithium battery 52.

It should be understood that a variety of form factors are suitable for the lithium battery 52. For example, the lithium battery 52 may include multiple lithium battery cells, a single battery pack, combinations thereof, and so on.

The additional components 34 may, for example, include the set of user controls 36 (e.g., pedals, switches, etc.), the cabling 38, a charging receptacle 60, and perhaps other electrical components 62 (e.g., lights, a global positioning system (GPS), specialized equipment, etc.). In some arrangements, the cabling 38 includes a communications bus, such as, for example, a controller area network (CAN) bus through which the motor system 30 and the lithium battery system 32 exchange communications 70 such as electronic CAN messages in accordance with the CAN protocol.

As shown in FIG. 3, in accordance with some example embodiments, the battery management system (BMS) 50 of the lithium battery system 32 includes a power delivery interface 100, a lithium battery interface 102, a wakeup circuit 104, a contactor 106, and a charge regulation circuit 108. These components may reside together as a single assembly or unit (e.g., within the same enclosure) or in a distributed manner among different locations on the utility vehicle body 22 (also see FIG. 1).

The power delivery interface 100 couples with the motor system 30. Similarly, the lithium battery interface 102 couples with the lithium battery 52. The wakeup circuit 104 controls closing and opening of the contactor 106 to electrically connect the motor system 30 to the lithium battery 52 and disconnect the motor system 30 from the lithium battery 52, respectively. During such operation, the charge regulation circuit 108 controls signal conditioning during discharging and charging of the lithium battery 52.

As further shown in FIG. 3, the contactor 106 includes a set of target contacts 120 that couple with the power delivery interface 100, a set of source contacts 122 that couple with the lithium battery interface 102, and an electromagnetic actuator 124. Although FIG. 3 shows the contactor 106 controlling two signal paths between the motor system 30 and the lithium battery 52 by way of example (i.e., there are two source contacts 122 and two target contacts 120), other arrangements include different numbers of contacts and signal paths (e.g., one, three, four, etc.) depending on the particular application/electrical needs/etc. (e.g., DC power signals at different voltages, AC power signals in different phases, ground, etc.).

The wakeup circuit 104 includes control logic 130 and a timer 132 which operate to manage access to the lithium battery 52. As will be explained in further detail shortly, such operation may be based on a variety of inputs 134 from the motor system 30, from the user controls 36 (directly or indirectly), and so on. Along these lines, in response to a wakeup event (e.g., a user turning on the BMS 50), the wakeup circuit 104 outputs an actuator signal 136 that actuates the electromagnetic actuator 124 in a first direction 140 from a first position to a second position that connects respective source contacts 122 to corresponding target contacts 120 to electrically connect the motor system 30 to the lithium battery 52. Along these lines, the electromagnetic actuator 124 may be provisioned with a solenoid or coil that closes the contactor 106 in response to the actuator signal 136.

Additionally, in response to a sleep event (e.g., encountering a predefined time period of non-use while the BMS 50 is awake), the wakeup circuit 104 terminates output of the actuator signal 136 which releases the electromagnetic actuator 124. For example, in some embodiments, the electromagnetic actuator 124 is spring biased in a second direction 142 which is opposite the first direction 140. Accordingly, termination of the actuator signal 136 enables the electromagnetic actuator 124 to return back from the second position to the first position thus automatically separating the source contacts 122 from the target contacts 120 when the wakeup circuit 104 terminates output of the actuation signal 136 thus disconnecting the motor system 30 from the lithium battery 52. As a result, there are no parasitic loads placed on the lithium battery 52 that could otherwise further discharge the lithium battery 52 to an over-depleted state.

In other embodiments, the wakeup circuit 104 does not need to constantly maintain the actuator signal 136. Instead, the wakeup circuit 104 controls engagement and disengagement of the contactor 106 using discrete engagement and disengagement signals. With such use of a dedicated release signal, maintenance of a signal and termination for release is not required.

Wakeup/Sleep

Figure 4:
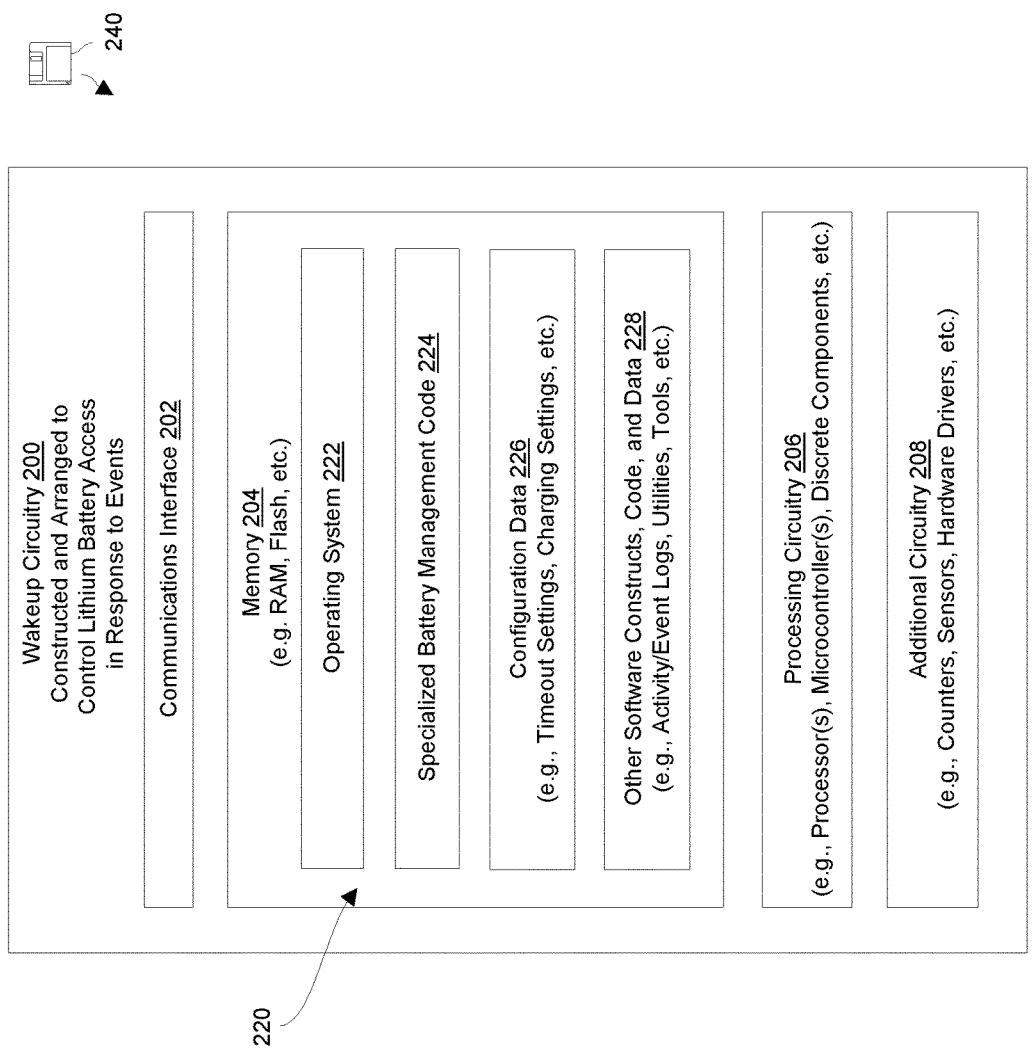
FIG. 4 is a block diagram of particular details of a wakeup circuit of a battery management system of the utility vehicle of FIG. 1 in accordance with some example embodiments.
Figure 5:
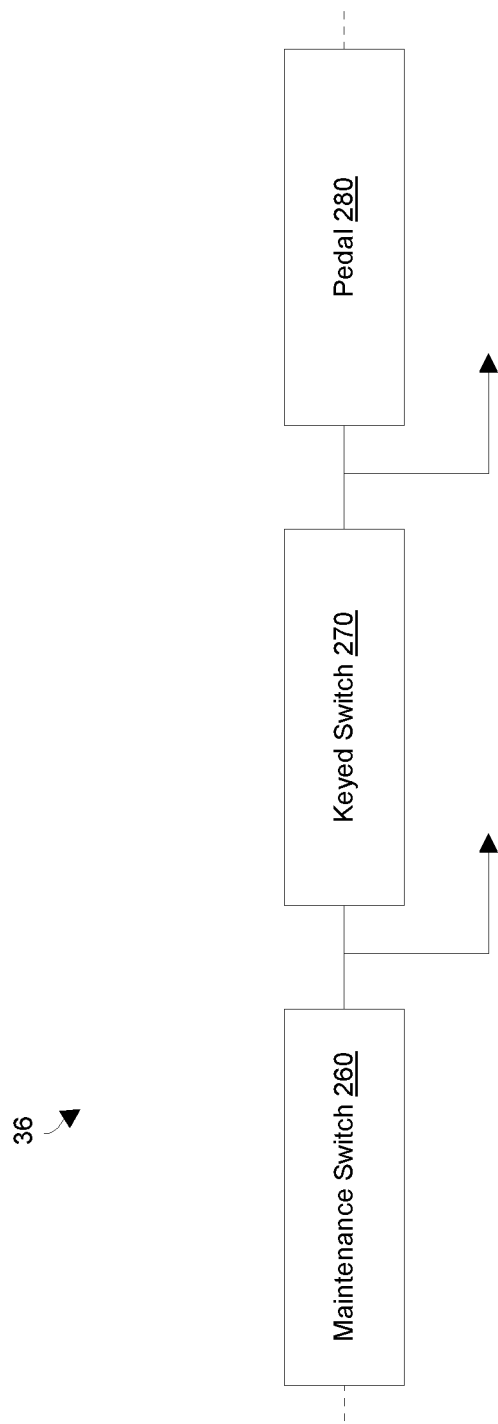
FIG. 5 is a block diagram of a first arrangement of particular user controls that provide input to the wakeup circuit of FIG. 4 in accordance with some example embodiments.
Figure 6:
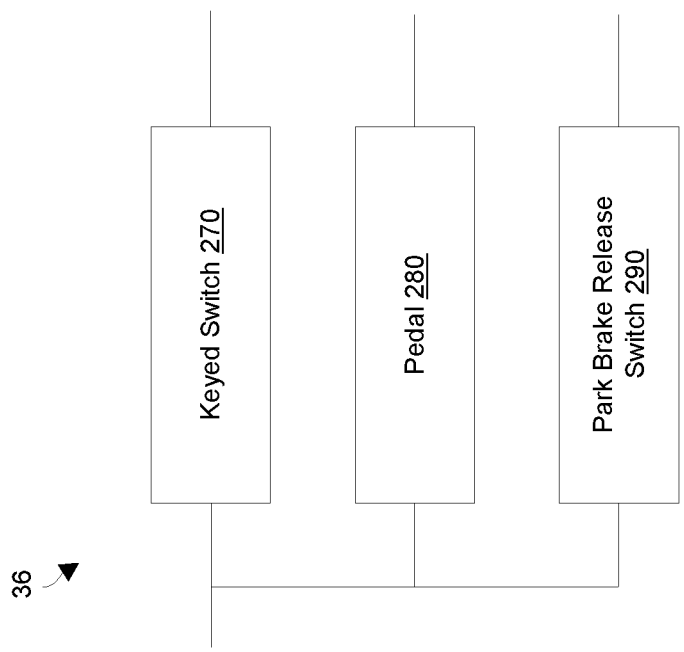
FIG. 6 is a block diagram of a second arrangement of particular user controls that provide input to the wakeup circuit of FIG. 4 in accordance with some example embodiments.

FIGS. 4 through 5 provide particular details of how the battery management system (BMS) 50 responds to wakeup and sleep events in accordance with some embodiments. FIG. 4 shows example details of wakeup circuitry 200 which is suitable for the wakeup circuit 104 (also see FIG. 3) in accordance with some embodiments. FIG. 5 shows a first arrangement of particular user controls 36 that couple with the inputs 134 and control operation of the wakeup circuit 104 (FIG. 3) in accordance with some embodiments. FIG. 6 shows a second arrangement of particular user controls 36 that couple with the inputs 134 and control operation of the wakeup circuit 104 (FIG. 3) in accordance with some embodiments.

As shown in FIG. 4, the wakeup circuitry 200 controls access to the lithium battery 52 (FIG. 3) in response to various events, situations, faults, etc. As shown in FIG. 4, the wakeup circuitry 200 includes, in an example embodiment, a communications interface 202, memory 204, processing circuitry 206, and additional circuitry 208. Such components form the control logic 130 and the timer 132 of the wakeup circuit 104 (FIG. 3).

The communications interface 202 is constructed and arranged to connect the wakeup circuitry 200 to one or more communications media such as a controller area network (CAN) bus (also see the cabling 38 in FIG. 1). Such communications may include different media such as copper-based (e.g., USB, RJ45, etc.), fiber optic communications, wireless communications (i.e., WiFi, cellular, Bluetooth, etc.), infrared, combinations thereof, and so on.

The memory 204 stores a variety of memory constructs 220 including an operating system 222, specialized battery management code 224, configuration data 226 (e.g., identification data, predefined timeout settings, charging settings, version data, model data, etc.), and other software constructs, code and data 228 (e.g., activity/event logs, utilities, tools, etc.). Although the memory 204 is illustrated as a single block in FIG. 4, the memory 204 is intended to represent both volatile and non-volatile storage (e.g., random access memory, flash memory, etc.), and may, in some embodiments, include a plurality of discrete physical memory units.

The processing circuitry 206 is configured to run in accordance with instructions of the various memory constructs 220 stored in the memory 204. In particular, the processing circuitry 206 runs the operating system 222 to manage various computerized resources (e.g., processor cycles, memory allocation, etc.). Additionally, the processing circuitry 206 runs the specialized battery management code 224 to electronically control access to the lithium battery 52 (FIGS. 2 and 3). The processing circuitry 66 may be implemented in a variety of ways including via one or more processors (or cores) running specialized software, application specific ICs (ASICs), field programmable gate arrays (FPGAs) and associated programs, microcontrollers, discrete components, analog circuits, other hardware circuitry, combinations thereof, and so on. In the context of one or more processors executing software, a computer program product 240 is capable of delivering all or portions of the software to the wakeup circuitry 200 (e.g., also see the memory constructs 220 in FIG. 4). The computer program product 240 has a non-transitory (or non-volatile) computer readable medium which stores a set of instructions which controls one or more operations of the wakeup circuitry 200. Examples of suitable computer readable storage media include tangible articles of manufacture and other apparatus which store instructions in a non-volatile manner such as flash memory, a magnetic storage medium (e.g., various disk memories such as a hard drive, floppy disk, or other magnetic storage medium), tape memory, optical disk (e.g., CD-ROM, DVD, Blu-Ray, or the like), and the like. It will be appreciated that various combinations of such computer readable storage media may be used to provide the computer readable medium of the computer program product 240 in some embodiments.

The additional circuitry 208 represents other circuitry of the wakeup circuitry 200. Such circuitry may include hardware counters, signal drivers, connectors, sensors, and so on. In some arrangements, where the utility vehicle is specialized equipment (e.g., a food and beverage vehicle, an ATV, etc.) the additional circuitry 208 may represent other components such as an electronic thermostat, lighting control, and so on.

With reference to FIG. 5 and in accordance with some embodiments, a first arrangement of the user controls 36 includes a maintenance switch 260, a keyed switch 270, and an accelerator (or throttle) pedal 280 which are electrically connected in series to the other circuitry of the motion control system 26 (also see FIG. 2). Such user controls 36 may communicate with the BMS 50 via the inputs 134 (FIG. 3). Other user controls 36 may be electrically connected to the motion control system 26 as well such as a brake pedal, a forward/reverse switch, and so on. In some arrangements, one or more of the user controls 36 connect directly to the motor system 30 and input signals are sensed by the BMS 50 from the motor system 30.

With reference to FIG. 6 and in accordance with some embodiments, a second arrangement of the user controls 36 includes a keyed switch 270, and an accelerator (or throttle) pedal 280, and a park brake release switch 290 (e.g., a switch which energizes and releases an electric brake to enable towing) which are electrically connected in parallel to the BMS 50 (also see FIG. 2). Such user controls 36 may communicate with the BMS 50 via the inputs 134 (FIG. 3). Other user controls 36 may be electrically connected to the motion control system 26 as well such as a brake pedal, a forward/reverse switch, a tow switch which is different from the park brake release switch, and so on.

In some embodiments, the keyed switch 270 includes a variety of different settings for on/off as well as transmission control (e.g., a forward position, a reverse position, a neutral position, and an off position). In other arrangements, there are separate control components for on/off control and transmission control.

In some embodiments, the park brake release switch 290 is formed by an actual physical switching device that a user can move to different positions. In other embodiments, the park brake release switch 290 is formed by a set of jumpers (e.g., connectors, cables, etc.) that are switchable or arrangeable into different connecting configurations (e.g., a normal configuration, a tow configuration, etc.).

It should be understood the control logic 130 and the timer 132 of the wakeup circuit 104 (FIG. 3), which are formed by the wakeup circuitry 200 (FIG. 4), operate to monitor user activity of the utility vehicle 20 as well as transition the BMS 50 from a sleeping state to an awake state and vice versa. Further details of such operation will now be provided.

During operation, the wakeup circuit 104 monitors operation of the user controls 36 to determine whether to electrically connect the lithium battery 52 to the motor system 30 or electrically disconnect the lithium battery 52 from the motor system 30. For example, suppose that a human operator (or user) wishes to operate the utility vehicle 20 after an extended period of non-use such as a 24-hour period. In such a situation, the utility vehicle 20 is initially in a sleep (or unawake) mode or state in which the wakeup circuit 104 (FIG. 3) is completely unpowered and the contactor 106 is open (i.e., where there is no circuit formed between the lithium battery 52 and the motor system 30). Accordingly, there are no electrical loads on the lithium battery 52 that could otherwise drain charge from the lithium battery 52.

Further details of wakeup/sleep operation will now be provided with reference to some embodiments in connection with FIG. 5. Suppose that the user turns the maintenance switch 260 to an ON position (e.g., by simply transitioning the maintenance switch 260 from an OFF position to the ON position, by cycling the maintenance switch 260 from the ON position to the OFF position and back to the ON position, etc.). In such a situation, the wakeup circuit 104 of the BMS 50 turns on and responds by outputting the actuation signal 136 to close the contactor 106 (FIG. 3). As a result of such a wakeup event, the contactor 106 connects the source contacts 122 to the target contacts 120 thus connecting the lithium battery 52 to the motor system 30 and waking the motor system 30.

At this time and in accordance with some embodiments, both the BMS 50 and the motor system 30 perform various self-tests and then enter normal operating states. For example, the BMS 50 checks the amount of charge remaining in the lithium battery 52 and, if the amount of charge is below a predefined minimum charge threshold, the BMS 50 terminates (e.g., immediately terminates) the actuation signal 136 to electrically disconnect the lithium battery 52 from the motor system 30. Such operation prevents the lithium battery 52 from becoming over-discharged. It should be understood that, while the BMS 50 remains awake, the BMS 50 continues to monitor charge remaining in the lithium battery 52 and terminates the actuation signal 136 to disconnect the lithium battery 52 from the motor system 30 if the remaining charge reaches (or falls below) the predefined minimum charge threshold to safeguard the battery against becoming over-discharged. For example, in some embodiments, there is still safety margin between the predefined minimum charge threshold and an over-discharged level.

In some embodiments, after passing their respective self-tests, the BMS 50 and the motor system 30 communicate with each other (e.g., exchange communications 70 such as CAN messages) to verify configuration information (e.g., model numbers, versions, status, etc.). In some arrangements, the motor system 30 may be one of multiple models and the wakeup circuit 104 operates using different configuration settings depending on the particular model identified via communications with the motor system 30.

Also, at this time, the control logic 130 of the wakeup circuit 104 starts the timer 132 (FIG. 3) which counts or tracks time until the timer 132 reaches a predefined idle time threshold (i.e., a maximum idle time limit). In accordance with some embodiments, example values that are suitable for use for the predefined idle time threshold include time amounts within the time range of 10 hours to 14 hours (e.g., 11 hours, 12 hours, 13 hours, etc.). In accordance with other embodiments, example values that are suitable for use for the predefined idle time threshold include time amounts within the time range of 2 hours to 6 hours (e.g., 3 hours, 4 hours, 5 hours, etc.). If the timer 132 counts from an initial time value to the predefined idle time threshold (a sleep event), the timer 132 outputs a sleep event signal to the control logic 130 of the wakeup circuit 104 which directs the control logic 130 to terminate output of the actuation signal 136 thus disconnecting the lithium battery 52 from the motor system 30. Such operation prevents the lithium battery 52 from unnecessarily succumbing to parasitic loads from the motor system 30, from the contactor 106 (i.e., the coil maintaining the contactor 106 in the closed position), and perhaps from elsewhere in the utility vehicle 20.

However, after BMS 50 has woken up, suppose that the user inserts a physical key into the keyed switch 270 and moves the keyed switch 270 from the OFF position to the ON position before the timer 132 reaches the predefined idle time threshold. In response to this sensed user activity, the control logic 130 restarts the timer 132 to the initial time value. Accordingly, the timer 132 is prevented from reaching the predefined idle time threshold and expiring.

Likewise, suppose that the user actuates the accelerator pedal 280 (e.g., moves the pedal 280 from its non-depressed position) before the timer 132 reaches the predefined idle time threshold. In response to this sensed user activity, the control logic 130 restarts the timer 132 to the initial time value. Again, the timer 132 is prevented from reaching the predefined idle time threshold and expiring. It should be understood that moving the accelerator pedal 280 may further signal the motor system 30 to operate the motor 42 (e.g., rotate the motor 42 in a particular direction and at a particular speed based on other factors).

However, if the user leaves the utility vehicle 20 unattended and the timer 132 reaches the predefined idle time threshold, the timer 132 expires (a sleep event) and sends a sleep event signal to the control logic 130. In response to the sleep event signal, the control logic 130 terminates output of the actuation signal 136 thus opening the contactor 106 to disconnect the lithium battery 52 from the motor system 30 (FIG. 3) and protecting the lithium battery 52 against further discharge.

In accordance with some embodiments, if the BMS 50 has fallen asleep and the maintenance switch 260 (FIG. 5) remains in the ON position, the user is able to wake the BMS 50 by moving the keyed switch 270 to the ON position (another wakeup event). Likewise, in accordance with some embodiments, if the BMS 50 has fallen asleep and the maintenance switch 260 and the keyed switch 270 are both in the ON position, the user is able to wake the BMS 50 by actuating the pedal 280 (yet another wakeup event).

In some embodiments and with reference to FIG. 5, the series configuration of the maintenance switch 260, the keyed switch 270, and the accelerator pedal 280 enables the maintenance switch 260 to disable sensing of the keyed switch 270 and the accelerator pedal 280. In particular, when the maintenance switch 260 is in the OFF position, the keyed switch 270 and the accelerator pedal 280 are unable to provide input to the control logic 130 of the wakeup circuit 104 thus preventing the user from waking up the BMS 50 via the keyed switch 270 or the pedal 280 while the maintenance switch 260 is in the OFF position.

Similarly, when the keyed switch 270 is in the OFF position, the accelerator pedal 280 is unable to provide input to the control logic 130 of the wakeup circuit 104. Accordingly, the user cannot wake up the BMS 50 simply by pushing on the accelerator pedal 280 while the keyed switch 270 is in the OFF position.

In some embodiments, while the maintenance switch 260 is in the ON position and the BMS 50 is awake, the motor system 30 and the BMS 50 operate to provide a walkaway protection feature that prevents the utility vehicle 20 from inadvertently rolling away at a high rate of speed. Along these lines, suppose that the user forgets to mechanically engage a brake to hold the utility vehicle 20 in place. If the utility vehicle 20 is perched on a hill and begins to roll, the motor system 30 senses that the utility vehicle 20 is moving but that the user is not pressing on the accelerator pedal 280. Accordingly, the motor system 30 of such embodiments provides proactive speed control and regenerative power. The proactive speed control maintains motor rotation at a low speed thus enabling the user to walk up to and stop the utility vehicle 20. Furthermore, the regenerative power recharges the lithium battery 52 thus improving efficiency.

Additional Details

Figure 7:
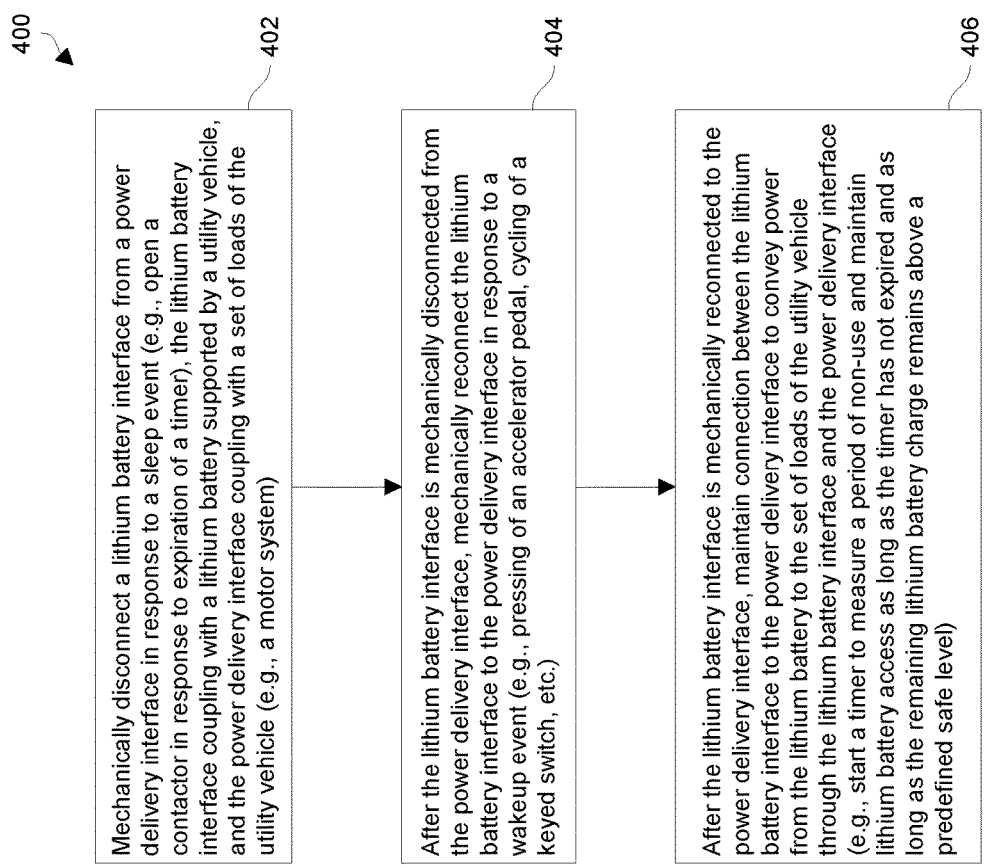
FIG. 7 is a flowchart of a procedure which is performed by the battery management system of the utility vehicle of FIG. 1 in accordance with some example embodiments.

FIG. 7 is a flowchart of a procedure 400 which is performed by the battery management system (BMS) 50 of the utility vehicle 20 to control access to the lithium battery 52 in accordance with some example embodiments.

At 402, the BMS 50 mechanically disconnects a lithium battery interface from a power delivery interface in response to a sleep event. The lithium battery interface couples with a lithium battery supported by the utility vehicle, and the power delivery interface couples with a set of loads of the utility vehicle. For example, a timer of the wakeup circuit may expire after a period of non-use thus indicating that the BMS 50 may disconnect the lithium battery 52 without interfering with a user of the utility vehicle 20. Such disconnection prevents parasitic loads from further draining the lithium battery 52.

At 404, after the lithium battery interface is mechanically disconnected from the power delivery interface, the BMS 50 mechanically reconnects the lithium battery interface to the power delivery interface in response to a wakeup event. For example, in accordance with some embodiments and in response to certain conditions, the user may press an accelerator pedal or cycle a keyed switch to wakeup the BMS 50.

At 406, after the lithium battery interface is mechanically reconnected to the power delivery interface, the BMS 50 maintains connection between the lithium battery interface and the power delivery interface to convey power from the lithium battery 52 to the set of loads of the utility vehicle through the lithium battery interface and the power delivery interface. In particular, the BMS 50 may start a timer to measure a period of non-use and maintain lithium battery access as long as the timer does not expire and as long as the lithium battery does not discharge below a predefined safe level.

As described above, improved techniques are directed to controlling electrical access to lithium batteries 52 on utility vehicles 20. Such techniques provide the ability to automatically disconnect the lithium batteries 52 from loads in response to timeout or sleep events. Such operation prevents the lithium batteries 52 from discharging even due to parasitic loads while the utility vehicles 20 are idle. Accordingly, the lithium batteries 52 will not discharge to unnecessarily low levels (e.g., safeguard levels). As a result, such operation robustly and reliably prevents the lithium batteries 52 from being recharged after being over-discharged and thus safeguards the lithium batteries 52 against becoming unstable.

Charging

Figure 8:
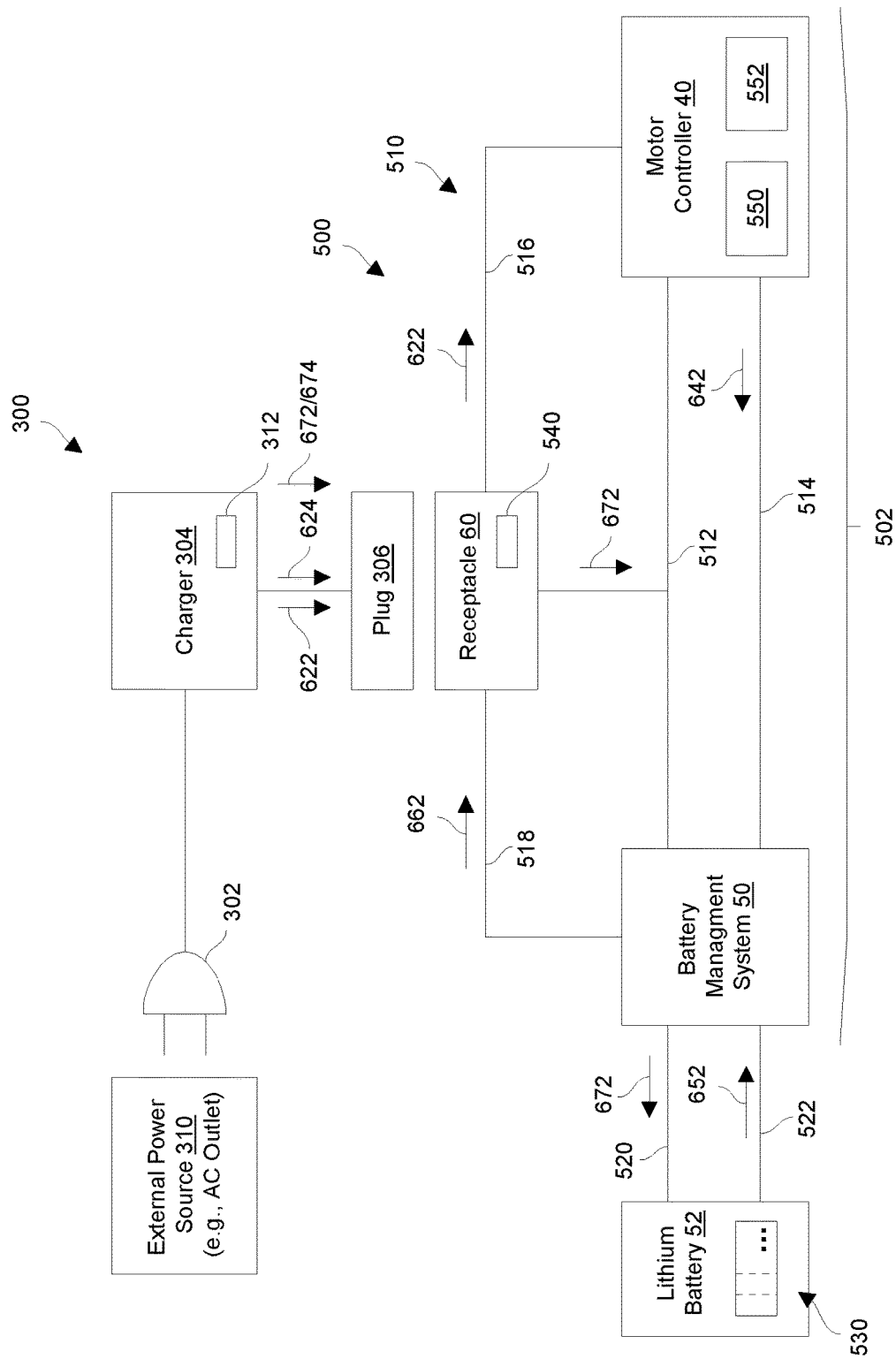
FIG. 8 is a block diagram of particular charging circuitry of the utility vehicle of FIG. 1 in accordance with some example embodiments.

FIG. 8 shows particular details of an external charger 300 and a charging system 500 of the utility vehicle 20. The external charger 300 includes a first plug 302, a charger (or adaptor) 304, and a second plug 306. The first plug 302 is constructed and arranged to connect the charger 304 to an external power source 310 such as an AC outlet. The second plug 306 is constructed and arranged to connect the charger 304 to the charging receptacle 60 of the utility vehicle 20 (also see FIG. 2). The charger 304 is constructed and arranged to convert and condition a power signal from the external power source 310 for use by the utility vehicle 20.

In some embodiments, the charger 304 includes a display 312 to display information to a user. Along these lines, the display 312 may include one or more light emitting diodes (LEDs) of various colors (e.g., green, red, etc.), a liquid crystal display (LCD), an LED display, some combination thereof, and/or other display element(s) capable of displaying information to a user.

As shown in FIG. 8 and in accordance with some embodiments, the charging system 500 of the utility vehicle 20 is formed by the receptacle 60, the lithium battery 52, and control circuitry 502. Furthermore, the control circuitry 502 is formed by the BMS 50 and at least a portion of the motor controller 40.

Although some of the connecting pathways may have been mentioned and/or illustrated earlier, the various components of the charging system 500 couple via a variety of pathways 510 (also see the cabling 38 in FIG. 1). In some embodiments, the receptacle 60 couples with the motor controller 40 and the BMS 50 via a power bus 512. In some embodiments, the motor controller 40 and the BMS 50 communicate over a communications bus 514. In some embodiments, the receptacle 60 further couples with motor controller 40 via an interlock signal pathway 516. In some embodiments, the receptacle 60 further couples with BMS 50 via a control signal pathway 518.

Additionally, in some embodiments, the BMS 50 couples with the lithium battery 52 via a power pathway 520, and a set of communications pathways 522. The power pathway 520 carries power to and from the lithium battery 52. The set of communications pathways 522 enables the BMS 50 to receive information (e.g., battery status such as voltage and temperature measurements) from the lithium battery 52.

As further shown in FIG. 8 and in accordance with some embodiments, the lithium battery 52 includes multiple lithium modules 530. Each lithium module 530 may include several lithium cells as well as circuitry to output individual status such as that module's minimum and maximum voltage, that module's minimum and maximum temperature, etc.

In some embodiments, the receptacle 60 includes a display 540 to indicate charging information to a user. In certain embodiments, the display 540 includes an LED that provides status to the user via different blinking or flashing patterns. In accordance with some embodiments, in response to different charging commands that the external charger 300 receives from the utility vehicle 20, the external charger 30 may flash or not flash the LED at different rates (e.g., a first speed to indicate charging at a normal rate, a second speed to indicate charging at a slow rate, and no flashing to indicate that the external charger 300 is not charging the lithium battery 52, etc.).

In some embodiments, the motor controller 40 includes detection circuitry 550 and electric brake control circuitry 552. The detection circuitry 550 is configured to detect connection between the external charger 300 and the receptacle 60 and convey such connection status to the BMS 50. The electric brake control circuitry 552 is configured to control power to the electric brake 44 (FIG. 2). Further charging details will be provided with reference to FIGS. 8 and 9.

Figure 9:
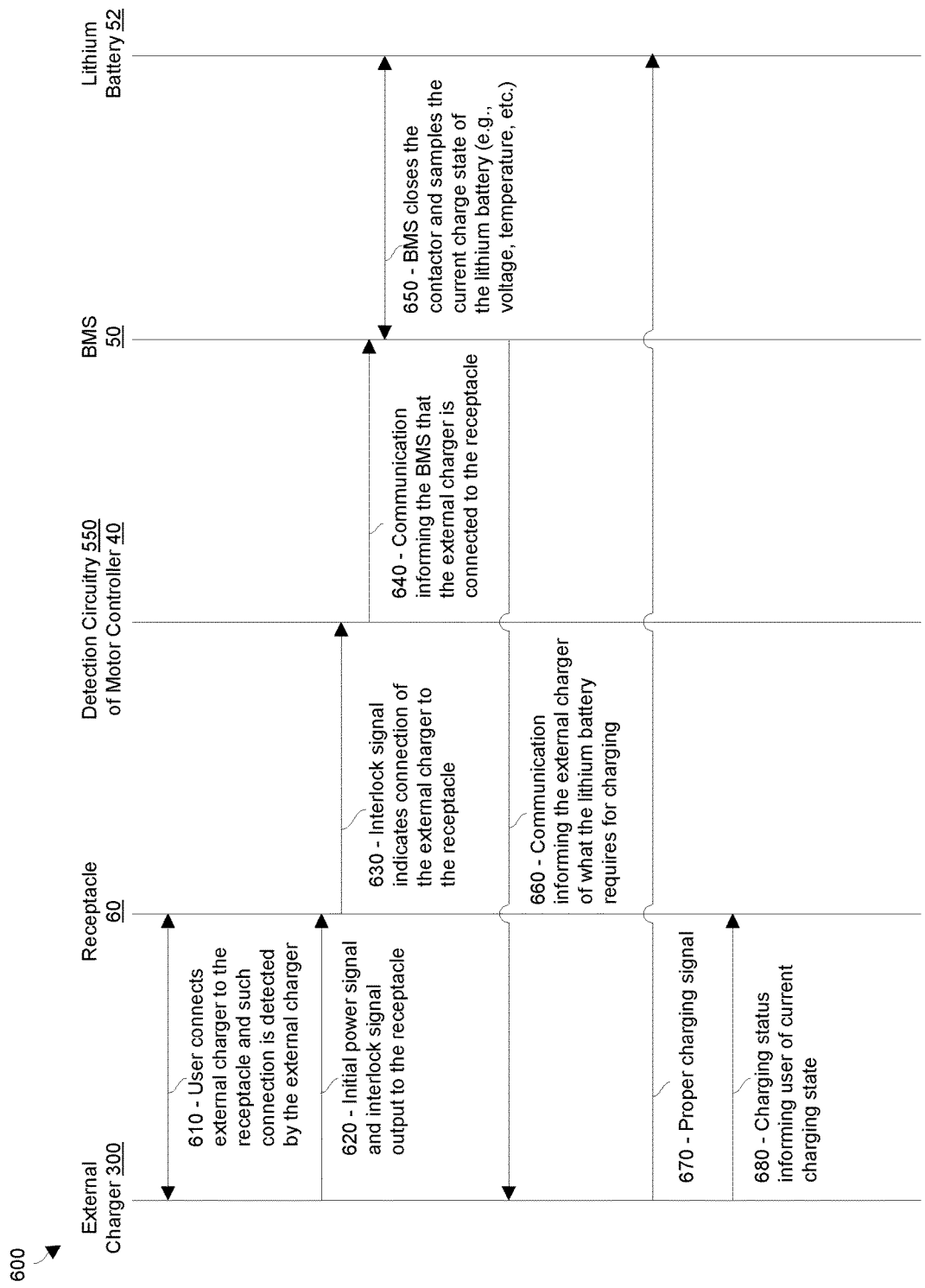
FIG. 9 is a sequence diagram illustrating particular charging activities that occur during lithium battery charging in accordance with some example embodiments.

FIG. 9 shows a sequence diagram 600 showing particular charging activities that occur during lithium battery charging in accordance with some embodiments. Suppose that a user wishes to charge the lithium battery 52 of the utility vehicle 20. In particular, the user may be ready to connect the external charger 300 to the receptacle 60 of the utility vehicle 20.

At 610, the user connects the external charger 300 to the receptacle 60 of the utility vehicle 20. In some embodiments, it does not matter whether the user plugs the external charger 300 into the external power source 310 (e.g., an AC outlet) before or after the user engages the plug 306 with the receptacle 60. Rather, the external charger 300 is considered properly connected to the receptacle 60 of the utility vehicle 20 once both events have occurred, i.e., the user has plugged the external charger 300 into the external power source 310 and the user engaged the plug 306 with the receptacle 60 (also see FIG. 8).

At 620, in response to the user plugging the external charger 300 into the external power source 310 and engaging the plug 306 with the receptacle 60, the external charger 300 outputs (i) an initial power signal 622 and (ii) an interlock signal 624 to the utility vehicle 20 (FIG. 8). In some embodiments, the initial power signal 622 is a temporary pulse (e.g., a 48 Volt power signal for a duration of six seconds). If the motor controller 40 and the BMS 50 are initially asleep, this initial power signal 622 wakes the motor controller 40 and the BMS 50 (e.g., the motor controller 40 and the BMS 50 power up and perform self-tests, the motor controller 40 and the BMS 50 perform sensing, etc.).

At 630, with the interlock signal 624 from the external charger 300 present at the receptacle 60 due to connection of the external charger 300 with the receptacle 60, the motor controller 40 detects the presence of the interlock signal 624 via the interlock signal pathway 516. In some embodiments, the detection circuitry 550 of the motor controller 40 tries to raise the interlock signal pathway 516 to a predefined voltage and a transistor in the receptacle 60 pulls that predefined voltage on the interlock signal pathway 516 low (e.g., to ground) in the absence of the external charger 300. When the user connects the external charger 300 to the receptacle 60, the transistor in the receptacle stops pulling the predefined voltage on the interlock signal pathway 516 low in response to the interlock signal 624 from the external charger 300. As a result, the detection circuitry 550 detects that the external charger 300 is connected to the receptacle 60.

At 640, in response to detecting connection of the external charger 300 with the receptacle 60, the control circuitry 550 of the motor controller 40 sends a communication 642 (FIG. 8) to the BMS 50 informing the BMS 50 that the external charger 300 is connected to the receptacle 60. In some embodiments, the communication 642 is a CAN message that the motor controller 40 sends to the BMS 50 the BMS 50 via a CAN bus (also see communications 70 in FIG. 2).

At 650, in response to the communication 642, the BMS 50 closes its contactor 106 (FIG. 3) and ascertains the current charge state of the lithium battery 52. In some embodiments, the BMS 50 routinely samples a current set of operating conditions 652 (FIG. 8) from the lithium battery 52 such as minimum and maximum voltage, minimum and maximum temperature, etc.

At 660, based at least in part on the current set of operating conditions 652, the BMS 50 provides a control signal 662 (FIG. 8) on the control signal pathway 518 to the external charger 60. In some embodiments, the control signal 662 informs the external charger 300 of what the lithium battery 52 requires for proper charging based on the condition of the lithium battery 52.

At 670, if the lithium battery 52 requires charging, the external charger 60 provides a proper power signal 672

(FIG. 8) to the lithium battery 52 based on the control signal 662. Additionally, in some embodiments and at 680, the external charger 60 provides a status signal 674 to the display 540 of the receptacle 60 to inform the user of the charging status (e.g., a slow blinking LED for a slow charge rate, a fast blinking LED for a normal charge rate, a solid LED for no charging due to the lithium battery being at full capacity, etc.). In some embodiments, the control signal 662, the interlock signal 624, and the status signal 674 are multiplexed through a cable connecting the charger 304 to the receptacle 60.

This above-described operation may continue until the lithium battery 52 is fully charged (e.g., repeating 630 through 670). As mentioned earlier, in accordance with some embodiments, "fully charged" refers to a charge level that is lower than the maximum capacity of the lithium battery 52 (e.g., 95% of maximum capacity, 90% of maximum capacity, etc.). In some embodiments, the BMS 50 is configured to routinely monitor the current charge state of the lithium battery 52 over time. If the BMS 50 determines that the lithium battery 52 requires different charging, the BMS 50 provides an appropriate control signal 662 to the external charger 300 directing the external charger to provide a proper power signal 672. It will be appreciated that such routine monitoring may encompass monitoring the current charge state of the lithium battery 52 over any of a variety of time intervals, including, for example, monitoring at various periodic intervals, monitoring at aperiodic intervals of varying time length, and/or in some embodiments, constant monitoring during one or more time periods. If the BMS 50 determines that the lithium battery 52 is fully charged, the BMS 50 provides an appropriate control signal 662 informing the external charger 300 to stop providing the power signal 672.

In some embodiments, the BMS 50 routinely samples, from all of the lithium modules 30, a current overall minimum voltage and a current overall maximum voltage. The BMS 50 compares these samples to a set of predefined voltage thresholds to determine whether the lithium battery 52 requires further charging or if the lithium battery 52 is fully charged. It will be appreciated that such routine sampling may encompass sampling over any of a variety of time intervals, including, for example, sampling at various periodic intervals, sampling at aperiodic intervals of varying time length, and/or in some embodiments, constant sampling during one or more time periods.

Additionally, in some embodiments, the BMS 50 routinely samples, a respective minimum temperature and a respective maximum temperature from each module 530. It will be appreciated that such routine sampling may encompass sampling over any of a variety of time intervals, including, for example, sampling at various periodic intervals, sampling at aperiodic intervals of varying time length, and/or in some embodiments, constant sampling during one or more time periods.

The BMS 50 further determines an overall current minimum temperature and an overall current maximum temperature for the lithium battery 52 as a whole from all of the respective module measurements. The BMS 50 compares these overall measurements to a set of predefined temperature thresholds to determine an appropriate rate of charge if any (also see the configuration data 226 in FIG. 4). For example, in accordance with some embodiments, the BMS 50 considers the lithium battery 52 ready to receive charging from the external charger 300 at a normal rate if the temperatures reside within a temperature range of 5 degrees Celsius to 45 degrees Celsius. Additionally, in accordance with some embodiments, the BMS 50 considers the lithium battery 52 ready to receive charging from the external charger 300 at a slow rate (i.e., a rate which is slower than the normal rate) if the temperatures reside within a suboptimal temperature range of −10 degrees Celsius to 5 degrees Celsius or within a suboptimal temperature range 45 degrees Celsius to 60 degrees Celsius (i.e., outside the range of 5 degrees Celsius to 45 degrees Celsius but within the range of −10 degrees Celsius to 60 degrees Celsius). Furthermore, in accordance with some embodiments, the BMS 50 considers the lithium battery 52 not ready to receive charging from the external charger 300 (i.e., a fault situation) if the temperatures reside outside the temperature range of −10 degrees Celsius to 60 degrees Celsius.

In some embodiments, the control signal 662 takes the form of a pulse width modulation (PWM) signal to imitate electrical behavior of a thermistor. Here, the BMS 50 outputs signals of different pulse widths to convey, as commands to the external charger 300, the different charging requirements of the lithium battery 52 (e.g., full, charge at a slow rate, charge at a normal rate, or fault).

In some embodiments, if the charging criteria changes over time and the external charger 300 updates the power signal 672, the external charger 300 also updates the status signal 674 to the display 540 of the receptacle 60. Accordingly, the user is able to identify whether the lithium battery 52 is charging and, if so, at what current rate. When the BMS 50 informs the external charger 300 that the lithium battery 52 should not be charged, the external charger 300 terminates the power signal 672 and sets its display 312 accordingly. In some embodiments, when the BMS 50 informs the external charger 300 that the lithium battery 52 is fully charged, the external charger 300 terminates the power signal 672 and provides a visual indication (e.g., lights a green LED) to inform the user. In some embodiments, when the BMS 50 informs the external charger 300 that the lithium battery 52 should not be charged due to a fault condition (e.g., a temperature reading outside a predefined temperature range), the external charger 300 terminates the power signal 672 and provides a visual indication (e.g., lights a red LED) to inform the user.

In response to determining that the lithium battery 52 is fully charged, the BMS 50 notifies the external charger 300 and goes to sleep by opening the contactor 106 (FIG. 3). In some embodiments, the BMS 50 may remain awake for a short time after the lithium battery 52 is fully charged. Along these lines, the control logic 130 of the BMS 50 may use the timer 132 (FIG. 3) to monitor inactivity time and then go to sleep if there is no further sensed electronic activity by the utility vehicle 20 before the timer 132 times out. That is, in response to expiration of the timer 132, the BMS 50 opens the contactor 106 and goes to sleep.

It should be understood that the various timeout times imposed by the timer 132 may be of different lengths depending on the particular circumstances. For example, the amount of time used by the timer 132 to monitor inactivity after lithium battery charging may be different from the amount of time used by the timer 132 to monitor inactivity after other events such as after the user has cycled the keyed switch 270 and/or after the user has let up on the accelerator pedal 280 after driving the utility vehicle 20. In some embodiments, the timer 132 uses a shorter timeout period to monitor inactivity in response to the lithium battery 52 being charged to full capacity.

In some embodiments, the pull-down transistor feature of the receptacle 60 operates as a safeguard in the event that the receptacle 60 is damaged and disconnects from the motor controller 40. In such a situation, the detection circuitry 550 of the motor control 40 will detect a high signal on the interlock signal pathway 516 since the detection circuitry 550 raises the voltage to a predefined level and the transistor in the receptacle is unable to pull that signal down due to disconnection.

In some embodiments, when the detection circuitry 550 of the motor controller 40 detects connection between the external charger 300 and the receptacle 60 (e.g., due to the presence of the interlock signal 624 on the interlock signal pathway 516), the detection circuitry 550 directs the electric brake control circuitry 552 to prevent the electric brake 40 from energizing (also see FIG. 8). Accordingly, the utility vehicle 20 remains stationary. Further details will now be provided with reference to FIG. 10.

Figure 10:
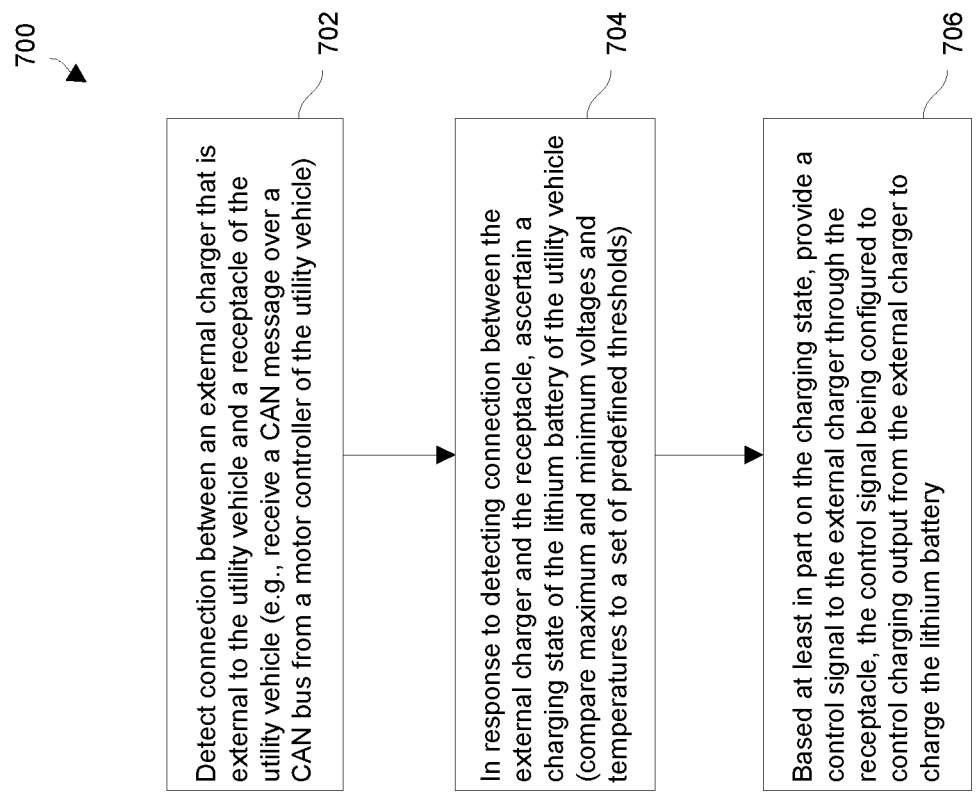
FIG. 10 is a flowchart of a procedure which is performed by circuitry of a utility vehicle during lithium battery charging in accordance with some example embodiments.

FIG. 10 is a flowchart of a procedure 700 which is performed by circuitry of a utility vehicle during lithium battery charging in accordance with some example embodiments. In some embodiments, the procedure 700 begins simply in response to a human user connecting an external charger to a receptacle of the utility vehicle.

At 702, the circuitry detects connection between an active external charger and a receptacle of the utility vehicle. In some embodiments, a motor controller of the utility vehicle provides a communication (e.g., a CAN message) to a BMS of the utility vehicle informing the BMS that the receptacle is connected to the external charger.

At 704, in response to detecting connection between the external charger and the receptacle, the circuitry ascertains a charging state of the lithium battery. In some embodiments, the circuitry samples maximum and minimum voltages and temperatures from individual lithium modules that form the lithium battery and compares these samples to a set of predefined thresholds to determine the current charging state of the lithium battery.

At 706, based at least in part on the charging state, the circuitry provides a control signal to the external charger through the receptacle. The control signal is configured to control charging output from the external charger to charge the lithium battery. In some embodiments, the external charger provides one of multiple different responses based at least in part on the control signal (e.g., terminate the charging signal due to the lithium battery being fully charged, provide a charge signal at a slow charge rate, provide a charge signal at a normal rate, terminate the charging signal due to a fault, etc.).

If the external charger is providing a charge signal to charge the lithium battery, the circuitry repeats 704 and 706. It will be appreciated that repetition of operations 704 and 706 may be performed at any of a variety of time intervals, including, for example, various periodic intervals, aperiodic intervals of varying time length, and/or in some embodiments, constant sampling during one or more time periods. As a result, the external charger continues to provide a charge signal and the lithium battery continues to charge.

When the lithium battery is fully charged, the circuitry detects this situation (e.g., based on monitoring the charging state of the lithium battery), and directs the external charger to terminate the charging signal. Additionally, the circuitry goes to sleep (e.g., after a short period of time) to prevent unnecessary discharging of the lithium battery.

As described above, improved techniques are directed to charging a lithium battery 52 of a utility vehicle 20 where a human user is able to initiate charging by simply connecting an external charger 300 to the utility vehicle 20. Such techniques do not require further human user input. Rather, the utility vehicle 20 is able to automatically respond by conveying charge from the external charger 300 to the lithium battery 52 and disconnecting the lithium battery 52 once the lithium battery 52 is fully charged. Accordingly, the human user does not need to remember to actuate a charge-enable switch and does not need to receive special training on how to operate such a switch.

Storage Mode

Figure 11:
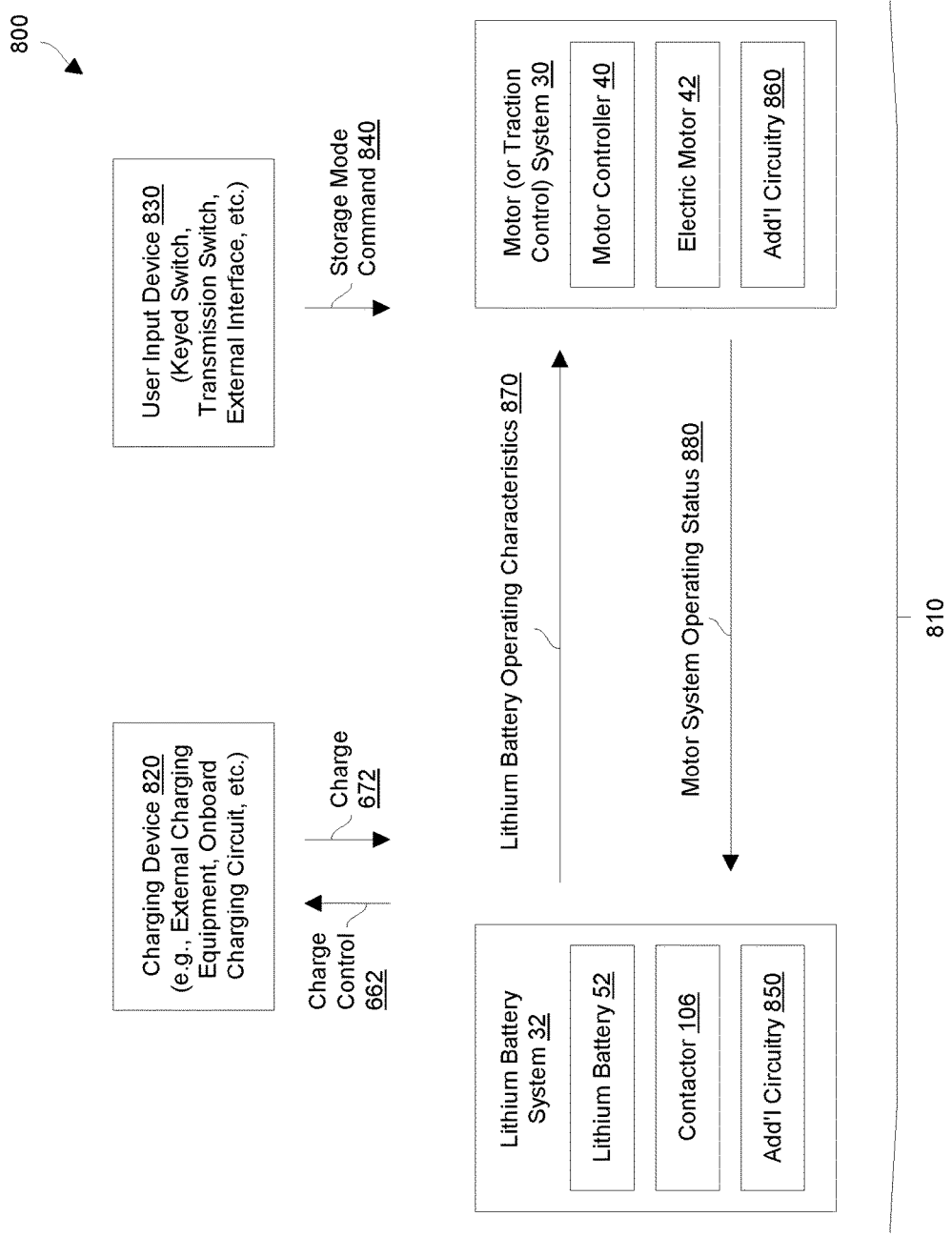
FIG. 11 is a block diagram illustrating particular details of electronic circuitry of a motor control system of the utility vehicle of FIG. 1 in accordance with some example embodiments.
Figure 12:
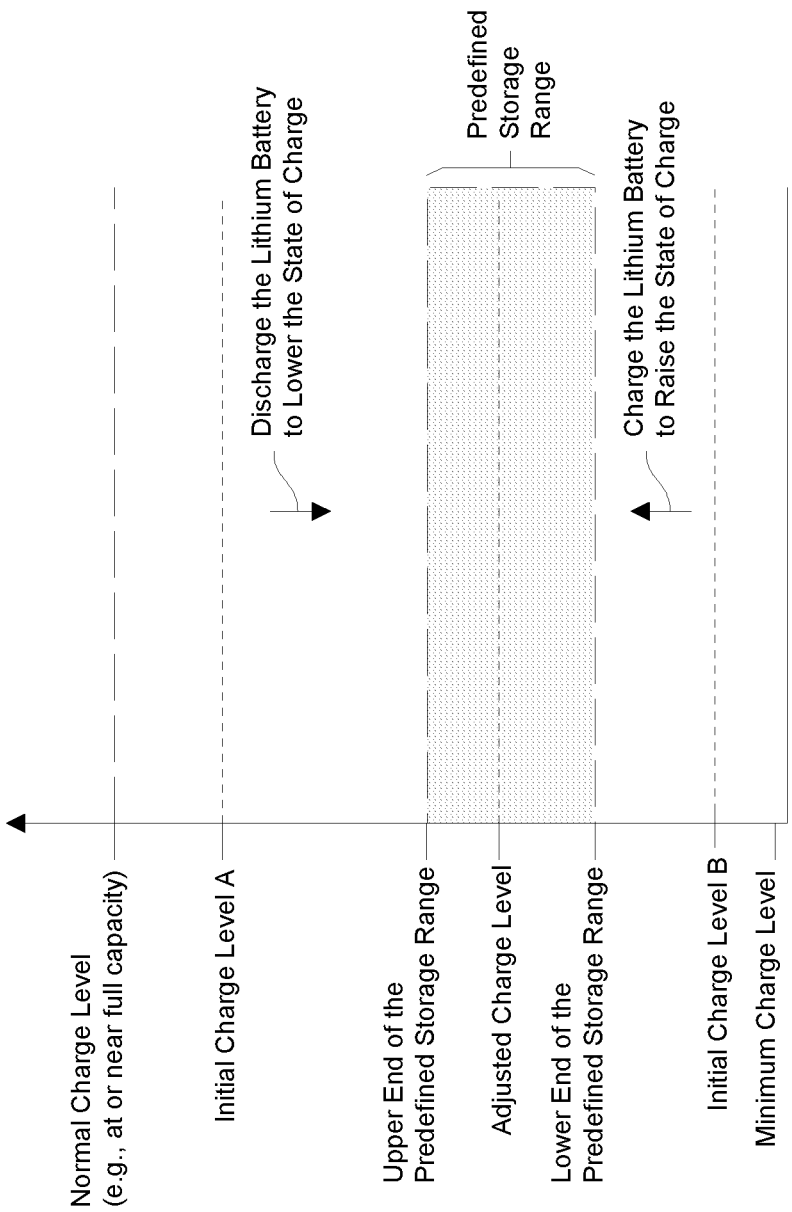
FIG. 12 is a graph of particular charge level details for a lithium battery of the utility vehicle of FIG. 1 in accordance with some example embodiments.
Figure 13:
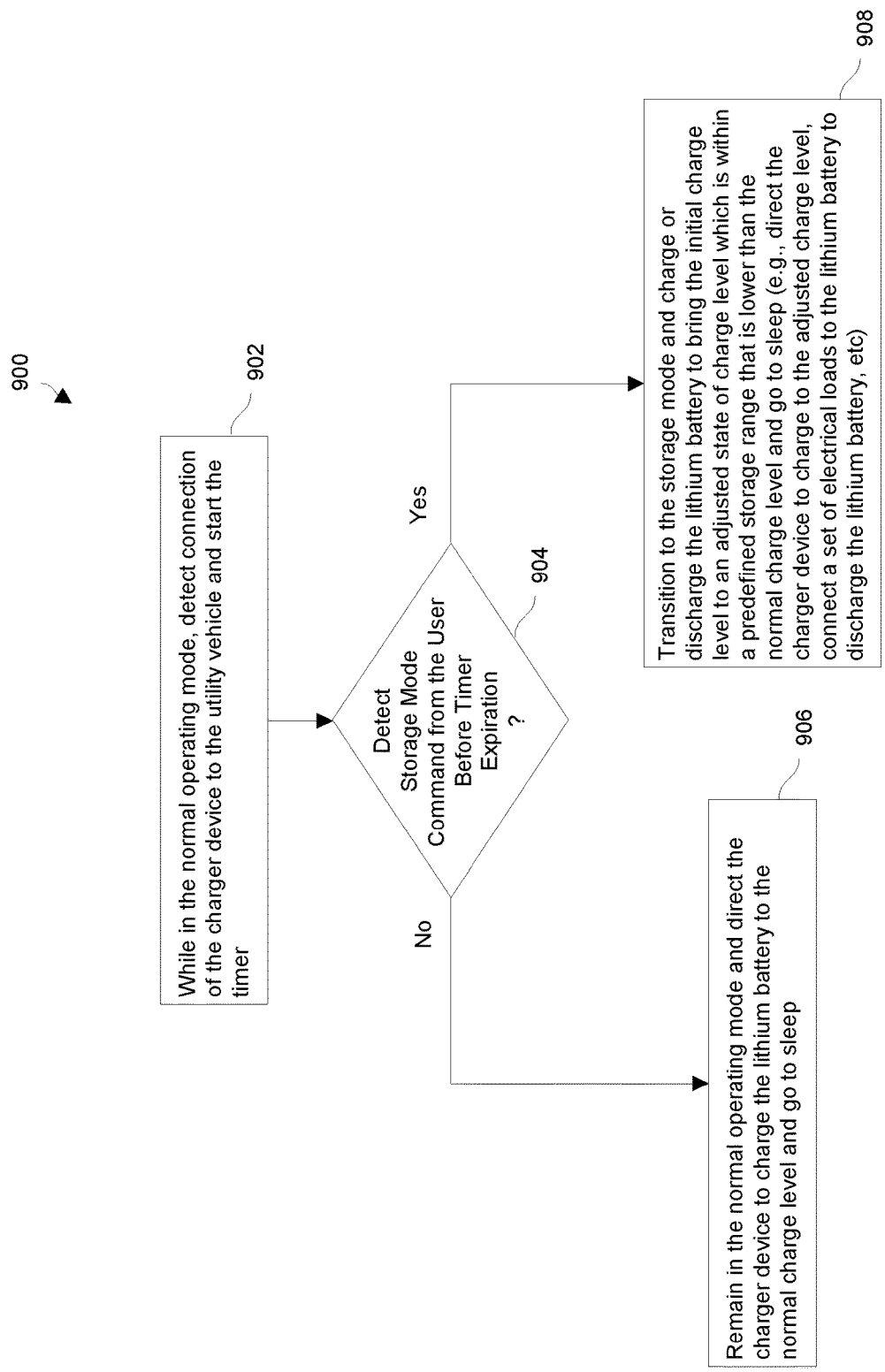
FIG. 13 is a flowchart of a procedure which is performed by the electronic circuitry of FIG. 11 in accordance with some example embodiments.

FIGS. 11 through 13 provide details of how various circuitry 800 operates to control state of charge of the lithium battery 52 of the utility vehicle 20 and thus maintain health of the lithium battery 52. FIG. 11 shows the various circuitry 800 which is involved in controlling state of charge of the lithium battery 52. FIG. 12 shows particular charge level details for the lithium battery 52. FIG. 13 shows a flowchart of a procedure which is performed to control state of charge of the lithium battery 52.

As shown in FIG. 11, the various circuitry 800 includes electronic circuitry 810 of the motor control system 26, a charging device 820, and a user input device 830. In accordance with some embodiments, the electronic circuitry 810 includes at least portions of the motor (or traction control) system 30 and the lithium battery system 32 (also see FIG. 2).

The electronic circuitry 810 is configured to operate in different modes in accordance with input from the user (e.g., a normal operating mode when the user is regularly using the utility vehicle 20 and a storage mode when the user plans to not use the utility vehicle 20 for an extended amount of time). As will be explained in further detail shortly, such operation helps sustain the capacity of the lithium battery 52 as well as prevent damage (e.g., by inhibiting expansion due to gas release).

The charging device 820 is configured to provide charge to the lithium battery 52. In some embodiments, the charging device 820 includes external charging equipment that interconnects between the utility vehicle 20 and an external power supply (e.g., see the external charger 300 and the external power source 810 in FIG. 8). In other embodiments, the charging device 820 includes an onboard charging circuit of the utility vehicle 20 that can connect directly to the external power supply.

The user input device 830 is configured to provide a storage mode command 840 to the electronic circuitry 800 to transition the electronic circuitry 810 from the normal operating mode to the storage mode. In some embodiments, the user input device 830 is a switch on the utility vehicle 20 (e.g., also see the user controls 36 in FIG. 2). Along these lines, the switch may be a dedicated physical switch that maintains the utility vehicle 20 in the normal operating mode when in a first position, and the storage mode when in a second position that is different from the first position. As another example, the switch may be a transmission switch (e.g., controlled via a key) that has different positions (e.g., a forward position to direct the motor system 30 to provide forward motion in response to pedal actuation, a reverse position to direct the motor system 30 to provide reverse motion in response to pedal actuation, a neutral position to place the motor system 30 in neutral, and an off position to disable use of the pedal and/or maintain the utility vehicle 20 in a parked state, etc.) and the storage mode command 840 takes the form of a predefined series of user-entered transmission settings (e.g., moving the transmission switch back and forth to different positions to enter a well-defined pattern that does not risk accidental triggering). As yet another example, the switch may be a foot pedal of the utility vehicle 20 (e.g., where the user operates the foot pedal in a particular manner or in combination with one or more other inputs from one or more other user controls). In other embodiments, the user input device 830 is an external user apparatus (e.g., a wireless smart device that uses Bluetooth, RFID, WiFi, etc., a wired service device such as a handheld diagnostic apparatus, a PC interface, etc.) that enables the user to remotely transition the electronic circuitry 800 from the normal operating mode to the storage mode as well as perform other operations (e.g., to monitor operating parameters of the utility vehicle 20, to change operating parameters of the utility vehicle 20, and so on). One will appreciate that other human-machine input/output (I/O) mechanisms (e.g., any user control on the utility vehicle 20, any external apparatus, combinations thereof, etc.) are suitable for entering the storage mode command 840 as well. In some embodiments, it is the motor system portion of the electronic circuitry 810 that detects this mode change event.

It should be understood that a wireless smart device (e.g., a smart phone, a tablet, a laptop computer equipped with a wireless modem, a desktop that communicates via a wireless router, a dedicated handheld service tool, etc.) operating as the user input device 830 may communicate with more than one utility vehicle 20 at the same time. For example, a user may operate such a smart device to direct a fleet of utility vehicles 20 to transition from the normal operating mode to the storage mode at the same time. Such operation is an improvement to the technology of controlling utility vehicles 20 since the smart device is able to coordinate operation of multiple vehicles simultaneously and thus decrease consumption of various device resources.

In accordance with some embodiments, the user input device 830 includes a management device that wirelessly communicates with a fleet of utility vehicles 20 (e.g., in a fleet barn). For example, the management device may connect to a wireline network or connect to a wireless network (e.g., WiFi, cellular, etc.). Along these lines, a user device anywhere in world could contact the management device and command it to change the charging mode for the fleet of utility vehicles 20.

During operation, the electronic circuitry 810 may reside initially in the normal operating mode in which the electronic circuitry 810 allows the lithium battery 52 to charge to a normal charge level. In some embodiments and as illustrated in FIG. 12, the normal charge level is at or close to the lithium battery's full capacity. Accordingly, normal operating mode enables long run times before the utility vehicle 20 requires recharging, and is appropriate for regular use so that the lithium battery 52 does not remain at a high state of charge for an excessive period of time (e.g., for more than two weeks, for more than a month, etc.) where the high state of charge could permanently degrade lithium battery capacity or where the lithium battery 52 could sustain damage (e.g., expansion due to gas release).

Suitable example states of charge for the normal charge level include 100% of battery capacity, 95% of battery capacity, 90% of battery capacity, and 85% of battery capacity, among other values. The higher percentage utilization of battery capacity enables the user to operate the utility vehicle 20 longer before needing to recharge the lithium battery 52. The percentage utilizations which are slightly lower than full capacity provide more conservative utilization of the lithium battery 52 that may reduce the likelihood of damaging the lithium battery 52. In some embodiments, the user is able to adjust the normal charge level (also see the configuration data 226 in FIG. 4).

Now, suppose that the user knows that the utility vehicle 20 will not be used for quite a while. Along these lines, perhaps the user is storing the utility vehicle 20 for a month, or an operating season, etc. In such a situation, the user directs the utility vehicle 20 to transition the electronic circuitry 810 from the normal operating mode to the storage mode by providing the storage mode command 840 (FIG. 11) from the user input device 830 to the electronic circuitry 810 while the electronic circuitry 810 is in the normal operating mode. In response to the storage mode command 840, the electronic circuitry 810 changes over from the normal operating mode to the storage mode.

When the electronic circuitry 810 operates in the storage mode, the electronic circuitry 810 automatically adjusts the amount of charge on the lithium battery 52 from an initial charge level which is outside a predefined storage range to an adjusted charge level which is within the predefined storage range (e.g., within a range of 20%-50% of full capacity). Along these lines, if the initial charge level is higher than the predefined storage range (e.g., see the initial charge level A in FIG. 12), the electronic circuitry 810 discharges the lithium battery 52 to lower the state of charge of the lithium battery 52 to the adjusted charge level. Alternatively, if the initial charge level is lower than the predefined storage range (e.g., see the initial charge level B in FIG. 12), the electronic circuitry 810 charges the lithium battery 52 (following connection of the charging device 820, see FIG. 11) to raise the state of charge of the lithium battery 52 to the adjusted charge level. In some embodiments, the adjusted charge level and/or the predefined charge range may be set/changed by the user (also see the configuration data 226 in FIG. 4).

Once the charge level of the lithium battery 52 is within the predefined storage range, the electronic circuitry 810 goes to sleep thus enabling the lithium battery 52. For example, in some embodiments, the lithium battery system 32 opens the contactor 106 to disconnect the lithium battery 52 from the utility vehicle loads and thus remain for an extended period of time (e.g., for a few weeks, for a month or more, etc.) at a healthy state of charge in which battery capacity is well preserved and the possibility of damaging the lithium battery 52 (e.g., due to gas release) is reduced.

After the electronic circuitry 810 of the utility vehicle 20 goes to sleep, the user may wake up the electronic circuitry 810 when the user is ready to use the utility vehicle 20 (e.g., via turning a switch). In accordance with some embodiments, the electronic circuitry 810 wakes up in the normal operating mode. In other embodiments, the particular mode is determined by the current position of a dedicated switch. While in the normal operating mode, if the user subsequently connects charging device 820 to the utility vehicle 20, the electronic circuitry 810 is configured to charge the lithium battery 52 up to the normal charge level.

It should be understood that the above-described operations for controlling state of charge of the lithium battery 52 may be performed by circuitry 850 of the lithium battery system 32, circuitry 860 of the motor system 30, or both (also see FIG. 11). At least some of the circuitry 850 of the lithium battery system 32 may be formed by control logic within the lithium battery system 32 (also see FIGS. 3 and 4). At least some of the circuitry 860 of the motor system 30 may be formed by the motor controller 40 of the motor system 30 (also see FIGS. 2 and 3).

In some embodiments, the circuitry 850 of the lithium battery system 32 and the circuitry 860 of the motor system 30 coordinate their operation to properly adjust the initial charge level of the lithium battery 52 to the adjusted charge level (FIG. 12). Such cooperation is facilitated by communications exchanged between the circuitry 850, 860. Along these lines, the lithium battery system circuitry 850 reads various operating characteristics from the lithium battery 52 such as maximum current, minimum current, maximum voltage, minimum voltage, temperature, etc. and communicates at least some of operating characteristics (or similar operating characteristics) 870 to the motor system 30. Additionally, the motor system circuitry 860 monitors various operating status (e.g., whether the utility vehicle 20 is connected to an external power supply, whether the user has provided a storage mode command, etc.) and communicates at least some this operating status (or similar operating status) 880 to the lithium battery system 32. In some embodiments, such information 870, 880 is conveyed between the lithium battery system 32 and the motor system 30 via CAN messages.

Now, suppose that the initial charge level is lower than the predefined storage range and the electronic circuitry 810 is initially in the normal operating mode. In this situation, further suppose that the user has connected the charging device 820 to the utility vehicle 20 to charge the lithium battery 52.

When the motor system 30 detects connection of the charging device 820, the motor system 30 informs the lithium battery system 32 that the charging device 820 is connected. For example, the motor system circuitry 860 of some embodiments sends a communication 880 (FIG. 11) to the lithium battery circuitry 850 (also see the communication 642 in FIG. 8). In response, the lithium battery circuitry 850 of such embodiments starts a timer to determine whether the lithium battery 52 should be charged to the normal charge level or the adjusted charge level (also see FIG. 12). If the timer expires (e.g., after five minutes) while the lithium battery system 32 remains in a normal operating state, the lithium battery circuitry 850 charges the lithium battery 52 to the normal charge level. In this regard, the lithium battery circuitry 850 of some embodiments provides a charge control signal 662 to the charging device 820 which then responds with an appropriate charge signal 672 that charges the lithium battery 52 as described earlier in connection with FIGS. 8 through 10 (e.g., charging at a normal rate, charging at a slow rate, etc.). After the lithium battery circuitry 850 determines that the lithium battery 52 has reached the normal charge level, the lithium battery circuitry 850 goes to sleep as described above.

However, if the user enters a storage mode command 840 to the motor system circuitry 860, the motor system circuitry 860 informs the lithium battery circuitry 850 (see the motor system operating status 880 in FIG. 11). If the timer of the lithium battery circuitry 850 has not yet expired, the lithium battery circuitry 850 moves from the normal operating state to a storage mode state and only charges the lithium battery 52 to the adjusted charge level which is within the predefined storage range and which is below the normal charge level. Such charging is reliably above the minimum charge level for the lithium battery 52 as well as appropriately below a high state of charge that could reduce the capacity of the lithium battery 52 and/or damage the lithium battery 52. To this end, the lithium battery circuitry 850 provides the charge control signal 662 to the charging device 820 which then responds with an appropriate charge signal 672 that charges the lithium battery 52 as described earlier in connection with FIGS. 8 through 10). After the lithium battery circuitry 850 determines that the lithium battery 52 has reached the adjusted charge level, the lithium battery circuitry 850 goes to sleep as described above.

On the other hand, suppose that the initial charge level is higher than the predefined storage range and the electronic circuitry 810 is initially in the normal operating mode. In this situation, further suppose that the user has connected the charging device 820 to the utility vehicle 20 to charge the lithium battery 52.

Again, when the motor system 30 detects connection of the charging device 820, the motor system 30 informs the lithium battery system 32 that the charging device 820 is connected. For example, the motor system circuitry 860 of some embodiments sends a communication 880 to the lithium battery circuitry 850 (also see the communication 642 in FIG. 8). In response, the lithium battery circuitry 850 of such embodiments starts a timer to determine whether the lithium battery 52 should be charged to the normal charge level or the adjusted charge level (also see FIG. 12). If the timer expires (e.g., after five minutes) while the lithium battery system 32 remains in a normal operating state, the lithium battery circuitry 850 of such embodiments charges the lithium battery 52 to the normal charge level and then goes to sleep.

However, if the user enters a storage mode command 840 to the motor system circuitry 860, the motor system circuitry 860 of some embodiments informs the lithium battery circuitry 850 (see the motor system operating status 880 in FIG. 11). If the timer of the lithium battery circuitry 850 of such embodiments has not yet expired, the lithium battery circuitry 850 moves to a storage mode state and, via the charge control signal 662, directs the charging device 820 not to charge the lithium battery 52 (e.g., by sending a no-charge command to the charging device 820). Instead, the lithium battery circuitry 850 allows the lithium battery 52 to discharge. Furthermore, the lithium battery circuitry 850 informs the motor system circuitry 860 of the current operating characteristics 870 of the lithium battery 32 (FIG. 11). For example, in some embodiments, the lithium battery circuitry 850 informs the motor system circuitry 860 that the lithium battery circuitry 850 is in a storage mode state and is allowing the lithium battery 52 to discharge in order to adjust the lithium battery 52 to the adjusted charge level (FIG. 12). In response, the motor system circuitry 860 connects the lithium battery 52 to various electric loads to facilitate discharging of the lithium battery 52. Example electric loads include the electric motor 42 (e.g., windings), the electric brake 44 (FIG. 2), a power dissipation resistor, a bank of battery draining resistors that can be looped to more quickly dissipate power, vehicle lights, ancillary circuitry, external circuitry available on the charging device 820, combinations thereof, etc.

It should be understood that discharging the lithium battery 52 while the electronic circuitry 810 is in the storage mode may take several hours or perhaps days. Accordingly, in some embodiments, the lithium battery system 32 disables its normal operating mode sleep mechanism to allow the lithium battery 52 state of charge to reach the adjusted charge level (FIG. 12).

After the lithium battery circuitry 850 determines that the lithium battery 52 has reached the adjusted charge level, the lithium battery circuitry 850 informs the motor system circuitry 860 that the lithium battery 52 has reached its target state of charge and that the lithium battery circuitry 850 is ready to go to sleep (see the lithium battery operating characteristics 870 in FIG. 11). In response, the motor system circuitry 860 disconnects the lithium battery 52 from the electric loads and informs the lithium battery circuitry 850 that the electric loads have been disconnected (see the motor system operating status 880 in FIG. 11). Next, the lithium battery circuitry 850 opens the contactor 106 thus disconnecting the lithium battery 52 from all loads and putting the electronic circuitry 810 to sleep.

It should be understood that, in accordance with some embodiments, each item of information such as the current charge level of the lithium battery 52, whether the traction controller is currently connecting the set of electrical loads to the lithium battery 52 to discharge the lithium battery 52, etc. may be conveyed between the lithium battery circuitry 850 and the motor system circuitry 860 via a set of messages (one or more messages). For example, in some embodiments, the BMS may inform the traction controller of the amount of charge on the lithium battery 52 using just one message. Similarly, in some embodiments, the traction controller may inform the BMS that the traction controller is connecting the set of electrical loads to the lithium battery 52 to discharge the lithium battery 52 using just one message. Further details will now be provided with reference to FIG. 13.

FIG. 13 shows a flowchart of a procedure 900 which is performed by the electronic circuitry 810 in accordance with some embodiments to control charge on the lithium battery 52 of the utility vehicle 20.

At 902, the electronic circuitry 810 operates in a normal operating mode in which the electronic circuitry 810 is configured to charge the lithium battery 52 of the utility vehicle 20 to a normal charge level when the user connects the charging device 820 and leaves the utility vehicle in the normal operating mode. Here, the electronic circuitry 810 detects connection of the charging device 820 to the utility vehicle 20 and starts a timer (FIGS. 8 and 11).

At 904, the electronic circuitry 810 determines whether the user has provided a storage mode command 840 (FIG. 11) prior to timer expiration. If the user provides the storage mode command 840 prior to timer expiration, 904 proceeds to 906 in response to this mode change event. If the user does not provide the storage mode command 840 prior to timer expiration, 904 proceeds to 908. In some embodiments, after the timer starts, the timer expires after a short period of time that gives the user the opportunity to enter the storage mode command 840 if the user plans to store the utility vehicle 20 (e.g., after three minutes, after five minutes, after 10 minutes, etc.). In some embodiments, the length of time is a parameter that is adjustable by the user (also see the configuration data 226 in FIG. 4).

At 906, if the user does not provide the storage mode command 840 before the timer expires, the electronic circuitry 810 remains in the normal operating mode and directs the charging device 820 to charge the lithium battery 52. Since the electronic circuitry 810 is still in the normal operating mode, the electronic circuitry 810 allows the lithium battery 52 to charge up to the normal charge level and then goes to sleep.

However, if the user provides the storage mode command 840 before the timer expires, the electronic circuitry 810 transitions from the normal operating mode to the storage mode. Since the electronic circuitry 810 is now the storage mode, the electronic circuitry 810 adjusts the current charge level of the lithium battery 52 to adjusted charge level (also see FIG. 12). That is, if the current charge level is lower than the predefined storage range, the electronic circuitry 810 directs the charging device 820 to charge the lithium battery 52 to the adjusted charge level within the predefined storage range and then goes to sleep. On the other hand, if the current charge level is higher than the predefined storage range, the electronic circuitry 810 directs the charger device 820 to not charge the lithium battery 52 and connects a set of electrical loads to the lithium battery 52 to discharge the lithium battery 52 to the adjusted charge level within the predefined storage range and then goes to sleep. If the current charge level is already within the predefined storage range, the electronic circuitry 810 may simply go to sleep.

In some arrangements, the electronic circuitry 810 may indicate the occurrence of certain events to the user by outputting a signal on an output device. Such events may include the utility vehicle 20 remaining in normal operating mode to charge the lithium battery 52 to the normal charge level, the utility vehicle 20 transitioning from the normal operating mode to the storage mode, the utility vehicle 20 terminating charging of the lithium battery 52 and going to sleep, etc. Suitable types of output signals include visual signals (e.g., one or more of lighting or flashing an LED on the receptacle), beeping a particular audio sequence (e.g., via a reverse buzzer), and so on.

In some arrangements, the electronic circuitry 810 starts in the normal operating mode and does not use a timer to impose a delay. Rather, the electronic circuitry 810 proceeds to directing the charging device 820 to charge the lithium battery 52. Such operation decreases the amount of time needed to charge the lithium battery 52.

In these arrangements, at any point the user may override the charging operation by switching the electronic circuitry 810 from the normal operating mode to the storage mode. Once the electronic circuitry 810 switches from the normal operating mode to the storage mode, the electronic circuitry 810 moves the amount of charge on the lithium battery 52 to the adjusted charge level unless the lithium battery 52 is already at the adjusted charge level.

As described above, improved vehicle storage techniques are directed to adjusting states of charge of lithium batteries 52 of utility vehicles 20 to predefined charge ranges (or levels) which are lower than normal charge levels that the lithium batteries charge to during normal operation. For example, if the normal charge level is 100% or 95% of the standard full charge level of the lithium batteries 52, the adjusted state of charge may be between 20% and 50%. Such techniques may be used when storing utility vehicles 20 for extended periods of time (e.g., more than a couple of weeks, a month, etc.). In some situations, such activities may be performed in an automated manner in response to storage commands provided by human users. With such techniques, the capacities of the lithium batteries 52 are preserved and the chances of releasing gas from the lithium batteries 52 are reduced.

While various embodiments of the present disclosure have been particularly shown and described, it will be understood by those skilled in the art that various changes in form and details may be made therein without departing from the spirit and scope of the present disclosure as defined by the appended claims.

It should be understood that, in accordance with some embodiments, during periods of storage, it is desirable to bring the lithium battery state of charge (SOC) to a specific level that: (i) avoids capacity degradation while stored in high ambient temperatures, and (ii) keeps the lithium battery from self-discharging below the safe minimum while in storage. Unfortunately, the current state of the art to discharge a lithium battery to a desired level for storage is a very inexact and labor intensive process that involves either separate equipment for discharging the lithium battery or discharging via vehicle operation. This process is very time consuming and error prone given its manual, iterative nature and is further compounded by large numbers of vehicles within golf fleets.

However, in accordance with at least some of the embodiments disclosed herein, a lithium battery may automatically be brought to a specific level for storage. Advantageously, at least some of the embodiments utilize existing vehicle components and requires no additional equipment or vehicle usage for discharging a lithium battery. Rather embodiments may employ existing vehicle control systems, inherent quiescent currents, and traction power devices to dissipate power from the lithium battery system in a controlled manner to yield a desired battery SOC for storage. In some embodiments, the specified SOC for storage is either a fixed value hard coded in one of the vehicle control systems or parameterized so that it can be user-adjusted via a service tool or wirelessly via a fleet management system. In accordance with some embodiments, to initiate a utility vehicle storage process, existing one or more vehicle inputs and feedback devices are utilized, e.g. vehicle key switch and vehicle reverse buzzer. In accordance with other embodiments, initiation of this process can be accomplished with the addition of a specific storage input switch or wirelessly via a fleet management system. An added benefit of an additional switch input specific to storage is that it may also serve as a wake-up to exit storage and bring the battery state of charge to normal levels for use.

Upon initiation of the utility vehicle storage process by any method mentioned above and in accordance with some embodiments, the vehicle control systems check the SOC of the battery pack. If the SOC is above the specified or desired storage SOC level, the vehicle control systems automatically discharge the lithium battery using loads available on the utility vehicle, and then enter a low power mode for storage. If the SOC is below the specified or desired storage SOC, the utility vehicle will allow charging up to the defined SOC level, then end charging and enter a low power mode for storage.

In some embodiments, the utility vehicle storage process utilizes the vehicle traction controller, the battery management system, the battery charger and energy consuming loads included on the utility vehicle. In these embodiments, the utility vehicle storage process also utilizes the vehicle key switch and reverse buzzer as well as the hand-held service tool. Additionally, wireless methods may be employed such as fleet management systems, keyless devices, or other devices capable of wireless communications/control such as smart phones or tablets. Yet another device that may be employed is a storage mode/wake-up switch.

In an example embodiment, the motor controller 40 is a Vehicle Traction Controller (VTC). To initiate the utility vehicle storage process and in accordance with some embodiments, the user connects DC from a powered charger to the vehicle (AC Connection if On Board Charger). This will inhibit traction as well as prepare the utility vehicle for charging if needed. Then the user triggers storage mode via a key switch sequence (or, if equipped, storage mode switch or one of the wireless methodologies). The VTC will then recognize the request and signal a confirmation via the vehicle reverse buzzer or, if equipped, via messaging over the Vehicle Data Network (VDN) to the Wireless Fleet Management Module, etc. Simultaneously, the VTC will communicate to the BMS over the Vehicle Data Network (VDN) that storage mode has been initiated. Upon receipt of storage mode over the VDN, the lithium battery system checks the battery SOC to determine if the battery SOC is above or below the desired SOC for storage. If the battery SOC is above the desired storage SOC, discharging will be required. If the battery SOC is below the desired storage SOC, charging will be required If the lithium battery needs to be discharged and in accordance with some embodiments, the BMS will communicate to the charger to defer charging. If available, the BMS will then activate the cell balancing resistor bank of the Battery Module to dissipate power from the lithium battery and reduce SOC. The BMS will also keep the pack contactor closed which will further reduce battery SOC by consuming power in the contactor coil. With the pack contactor closed, power will be supplied to the rest of the vehicle electrical system and further reduce battery SOC via all of the power consumed by component quiescent power draw. The VTC will take action to reduce battery SOC by activating the vehicle contactor to further decrease battery SOC. With the vehicle contactor closed, the VTC controller will further reduce battery SOC by passing a controlled current through the stator of the Vehicle Traction Motor. For utility vehicles with DC motors, the VTC will keep the armature circuit open to prevent vehicle travel. For utility vehicles with AC motors, the VTC will pass only DC to the stator circuit to prevent vehicle travel. If the utility vehicle is equipped with a power dissipation resistor, the VTC will pass a controlled current through this device as an additional means to reduce battery SOC.

In this example embodiment, if the lithium battery needs to be charged, the BMS will initiate a charge cycle. The charge cycle initiated by the BMS may be a default charge cycle or a charge cycle specific to a storage mode selectable via a service tool or wirelessly via a fleet management system.

When the lithium battery SOC reaches the desired level for storage, the BMS will communicate over the VDN to the VTC to cease all power dissipation. Once the VTC ceases all active power dissipation, the VTC will communicate this over the VDN to the BMS. At this point, the BMS will then open the pack contactor and go into power down.

It should be understood that the challenge of storing a lithium battery powered utility vehicle is new to the industry. For lead acid vehicles, long term storage at partial charge levels will damage the cells and drastically reduce the state of health of the pack. In automotive applications of lithium ion batteries, long term storage of two or more months is not typical particularly during hot weather. In golf/utility industry, a technician carrying large load bank must connect the load to each vehicle needing discharging. If such a manual method is required to set SOC for storage, it would require the technician to lay hands on each car and carefully watch the SOC manually and disconnect the load once the SOC reached the storage level then move on to another vehicle. In a fleet of 60-150 cars, this would take hours or perhaps weeks of labor.

Advantageously, the improved techniques disclosed herein may be used on any electric vehicle with a BMS/lithium ion battery that communicates with a Vehicle Traction Controller or Vehicle Systems Controller and is powered by an Electric Motor. Such techniques are more precise in terms of charge adjustment, less cumbersome, and can be performed in parallel on multiple utility vehicles at the same time.

In some embodiments, the predefined storage range is defined by an upper end threshold, and a lower end threshold (also see FIG. 12). In some embodiments each threshold is a stored parameter which is adjustable by the user (e.g., see the configuration data 226 in FIG. 4). The upper end and lower end thresholds may be different values (i.e., an upper value and a lower value) or even the same values. In some embodiments, the user is prevented from modifying certain parameters and/or thresholds to values which could risk damaging or diminishing health of the lithium battery 52.

Additionally, it should be understood that the keyed switch was described above as being used in certain example embodiments. It will be appreciated that the keyed switch is just one example of an ignition switch that may be used in various embodiments. For example, in other example embodiments, the vehicle uses a keyless, push-button ignition rather than a keyed switch. Such ignition is enabled when an "electronic key" (e.g., an RF device) on the passenger's person is within range of a wireless sensor of the vehicle. Here, an actuation of the switch occurs through presence of the electronic key in combination with physical actuation of the button.

Furthermore, in some embodiments, the BMS 50 utilizes an inactivity timer that measures inactivity time based on current (also see the timer 132 in FIG. 3). For example, the inactivity timer starts timing inactivity when current sensed from the lithium battery falls below a predefined current threshold (e.g., 3 amps). As long as the current remains below this predefined current threshold, the inactivity timer continues to measure time. However, if the current rises above the predefined current threshold, the inactivity timer is cleared (or reset) because this rise in current above the predefined current threshold is considered detected activity. The inactivity timer then starts counting again when current falls below the predefined current threshold. If the inactivity timer ever reaches a timeout value, the inactivity timer is considered to have expired (i.e., detected an inactivity timeout event).

As mentioned earlier, in some embodiments, the electronic circuitry 810 operates based on a set of preset levels. For example, the adjusted charge level and/or the bounds of the predefined storage range may be static values, adjustable parameters, combinations thereof, etc. In certain embodiments, the electronic circuitry 810 accesses preprogrammed settings in a data structure (e.g., a lookup table or tables) correlated with various locations and/or times of year (also see the configuration data 226 in FIG. 4). In some embodiments, the electronic circuitry 810 automatically determines the appropriate setting(s) for a given location and/or time of year. Thus, for example, if the user knows the average temperature and/or humidity in Augusta, Ga. in July, then the user is able to utilize a correlated set of preprogrammed settings. In some embodiments, location and/or time of year can be electronically provided to the electronic circuitry 810 (e.g., by the user through a user interface and then used by electronic circuitry 810 to lookup correlated settings, from circuitry such as GPS circuitry, a clock having date information, and so on). Such modifications and enhancements are intended to belong to various embodiments of the disclosure.

What is claimed is:

1. A control system to control state of charge of a lithium battery of a utility vehicle, the control system comprising:
a lithium battery configured to provide lithium battery power to a set of electrical loads of the utility vehicle; and
electronic circuitry coupled with the lithium battery, the electronic circuitry being configured to:
operate in a normal operating mode in which the electronic circuitry charges the lithium battery of the utility vehicle up to a normal charge level,
after operating in the normal operating mode, transition from the normal operating mode to a storage mode in which the electronic circuitry is configured to set an amount of charge on the lithium battery to within a predefined storage range that is lower than the normal charge level, and in response to transitioning from the normal operating mode to the storage mode, adjust the amount of charge on the lithium battery from an initial charge level which is outside the predefined storage range to an adjusted charge level which is within the predefined storage range;
wherein the electronic circuitry, when transitioning from the normal operating mode to the storage mode, is configured to:
receive, as user input, a storage mode command from a user input device operated by a user, and
automatically move the electronic circuitry from the normal operating mode to the storage mode in response to the storage mode command.

2. The control system as in claim 1 wherein the user input device is a mode control switch of the utility vehicle; and wherein the electronic circuitry, when receiving the storage mode command, is configured to:
detect, as the storage mode command, a mode change event in which the user switches the mode control switch from a normal operating mode position to a storage mode position.

3. The control system as in claim 1 wherein the user input device is a transmission switch of the utility vehicle, the transmission switch being equipped with a forward position, a reverse position, a neutral position, and an off position; and wherein the electronic circuitry, when receiving the storage mode command, is configured to:
detect, as the storage mode command, a predefined series of user-entered transmission settings from the transmission switch in response to the user changing positions of the transmission switch.

4. The control system as in claim 1 wherein the user input device is an external apparatus which communicates wirelessly with the electronic circuitry of the utility vehicle; and wherein the electronic circuitry, when receiving the storage mode command, is configured to:
detect, as the storage mode command, a wireless communication from the external apparatus.

5. The control system as in claim 1 wherein the user input device is a pedal switch of the utility vehicle; and wherein the electronic circuitry, when receiving the storage mode command, is configured to:
detect, as the storage mode command, a set of movements of the pedal switch in response to actuation of the pedal switch by the user's foot.

6. The control system as in claim 1 wherein the user input device is an external service device which is configured to temporarily connect to the electronic circuitry during utility vehicle servicing; and wherein the electronic circuitry, when receiving the storage mode command, is configured to:
detect, as the storage mode command, an electronic signal from the external service device while the external service device is temporarily connected to the electronic circuitry.

7. A control system to control state of charge of a lithium battery of a utility vehicle, the control system comprising:
a lithium battery configured to provide lithium battery power to a set of electrical loads of the utility vehicle; and
electronic circuitry coupled with the lithium battery, the electronic circuitry being configured to:
operate in a normal operating mode in which the electronic circuitry charges the lithium battery of the utility vehicle up to a normal charge level,
after operating in the normal operating mode, transition from the normal operating mode to a storage mode in which the electronic circuitry is configured to set an amount of charge on the lithium battery to within a predefined storage range that is lower than the normal charge level, and in response to transitioning from the normal operating mode to the storage mode, adjust the amount of charge on the lithium battery from an initial charge level which is outside the predefined storage range to an adjusted charge level which is within the predefined storage range;

wherein the electric circuitry, when operating the in the normal operating mode, is configured to:

detect connection of a charger to the utility vehicle, the charger being configured to charge the lithium battery up to the normal charge level while the electronic circuitry is in the normal operating mode.

8. The control system as in claim 7 wherein the electronic circuitry includes a battery management system (BMS) configured to control charging and discharging of the lithium battery and a traction controller configured to control traction of the utility vehicle; and wherein the traction controller is further configured to:

sense that the charger is connected to a receptacle of the utility vehicle, and in response to sensing that the charger is connected to the receptacle, send a charger detection message to the BMS, the charger detection message indicating to the BMS that the charger is connected to the receptacle of the utility vehicle.

9. The control system as in claim 8 wherein the BMS is further configured to:

in response to the charger detection message, start a timer, the BMS being further configured to begin charging the lithium battery if the electronic circuitry does not transition from the normal operating mode to the storage mode within a predefined amount of time after the timer is started.

10. The control system as in claim 9 wherein the traction controller is further configured to:

after the timer is started and before the predefined amount of time elapses since starting the timer, (i) receive a storage mode command from a user, and (ii) in response to the storage mode command, send a storage mode message to the BMS, the storage mode message directing the BMS to transition from a normal operating state to a storage state.

11. The control system as in claim 10 wherein the initial charge level is lower than the predefined storage range; and wherein the electronic circuitry, when adjusting the amount of charge on the lithium battery, is configured to:

after the BMS has transitioned from the normal operating state to the storage state, charge the lithium battery via the charger until the amount of charge on the lithium battery is within the predefined storage range.

12. The control system as in claim 11 wherein the BMS is further configured to:

while the BMS is in the storage state and when the amount of charge on the lithium battery is lower than the predefined storage range, send a set of charge commands to the charger, the set of charge commands directing the charger to output charge that charges the lithium battery.

13. The control system as in claim 12 wherein the BMS is further configured to:

while the BMS is in the storage state and when the amount of charge on the lithium battery is within the predefined storage range, send a set of no-charge commands to the charger, the set of no-charge commands directing the charger to not output charge to the lithium battery.

14. The control system as in claim 12 wherein the BMS is further configured to:

while the BMS is in the storage state and when the amount of charge on the lithium battery is within the predefined storage range, open a contactor that is interconnected between the charger and the lithium battery to disconnect the lithium battery from the charger and the traction controller.

15. The control system as in claim 10 wherein the initial charge level is higher than the predefined storage range; and wherein the electronic circuitry, when adjusting the amount of charge on the lithium battery, is configured to:

after the BMS has transitioned to the storage state, discharge the lithium battery until the amount of charge on the lithium battery is within the predefined storage range.

16. The control system as in claim 15 wherein the traction controller is further configured to:

receive an initial set of charge level messages from the BMS, the initial set of charge level messages indicating that the amount of charge on the lithium battery is higher than the predefined storage range, and in response to the initial set of charge level messages indicating that the amount of charge on the lithium battery is higher than the predefined storage range, (i) connect the lithium battery to the set of electrical loads to discharge the lithium battery, and (iii) send a set of discharge messages to the BMS indicating that the traction controller is connecting the set of electrical loads to the lithium battery to discharge the lithium battery.

17. The control system as in claim 16 wherein the BMS is further configured to:

while the traction controller connects the lithium battery to the set of electrical loads and in response to the set of discharge messages from the traction controller, send a set of no-charge commands to the charger, the set of no-charge commands directing the charger to not output charge to the lithium battery.

18. The control system as in claim 16 wherein the traction controller is further configured to:

after receiving the initial set of charge level messages from the BMS, receive a subsequent set of charge level messages from the BMS, the subsequent set of charge level messages indicating that the amount of charge on the lithium battery is within the predefined storage range, and in response to the subsequent set of charge level messages indicating that the amount of charge on the lithium battery is within the predefined storage range, (i) disconnect the lithium battery from the set of electrical loads, and (iii) send a set of disconnection messages to the BMS indicating that the traction controller has disconnected the set of electrical loads from the lithium battery.

19. The control system as in claim 18 wherein the BMS is further configured to:

while the BMS is in the storage state, when the amount of charge on the lithium battery is within the predefined storage range and in response to the set of disconnection messages from the traction controller, open a contactor that is interconnected between the charger and the lithium battery to disconnect the lithium battery from the charger and the traction controller.

20. A utility vehicle, comprising:
a utility vehicle body;
a set of electrical loads supported by the utility vehicle body; and
a control system supported by the utility vehicle body and coupled with the set of electrical loads, the control system including:
 a lithium battery configured to provide lithium battery power to the set of electrical loads, and
 electronic circuitry coupled with the lithium battery, the electronic circuitry being configured to:
  operate in a normal operating mode in which the electronic circuitry charges the lithium battery of the utility vehicle up to a normal charge level,
  after operating in the normal operating mode, transition from the normal operating mode to a storage mode in which the electronic circuitry is configured to set an amount of charge on the lithium battery to within a predefined storage range which is lower than the normal charge level, and
  in response to transitioning from the normal operating mode to the storage mode, adjust the amount of charge on the lithium battery from an initial charge level which is outside the predefined storage range to an adjusted charge level which is within the predefined storage range:
wherein the electronic circuitry, when transitioning from the normal operating mode to the storage mode, is configured to:
 receive, as user input, a storage mode command from a user input device operated by a user, and
 automatically move the electronic circuitry from the normal operating mode to the storage mode in response to the storage mode command.

21. A method of controlling charge on a lithium battery of a utility vehicle, the method comprising:
operating electronic circuitry of the utility vehicle in a normal operating mode in which the electronic circuitry charges the lithium battery of the utility vehicle up to a normal charge level;
after operating the electronic circuity in the normal operating mode, transitioning the electronic circuitry from the normal operating mode to a storage mode in which the electronic circuitry is configured to set an amount of charge on the lithium battery to within a predefined storage range which is lower than the normal charge level; and
in response to transitioning the electronic circuitry from the normal operating mode to the storage mode, adjusting the amount of charge on the lithium battery from an initial charge level which is outside the predefined storage range to an adjusted charge level which is within the predefined storage range:
wherein transitioning the electronic circuitry from the normal operating mode to the storage mode includes:
 receiving, as user input, a storage mode command from a user input device operated by a user, and
 automatically moving the electronic circuitry from the normal operating mode to the storage mode in response to the storage mode command.

22. A utility vehicle, comprising:
a utility vehicle body;
a set of electrical loads supported by the utility vehicle body; and
a control system supported by the utility vehicle body and coupled with the set of electrical loads, the control system including:
 a lithium battery configured to provide lithium battery power to the set of electrical loads, and
 electronic circuitry coupled with the lithium battery, the electronic circuitry being configured to:
  operate in a normal operating mode in which the electronic circuitry charges the lithium battery of the utility vehicle up to a normal charge level,
  after operating in the normal operating mode, transition from the normal operating mode to a storage mode in which the electronic circuitry is configured to set an amount of charge on the lithium battery to within a predefined storage range which is lower than the normal charge level, and
  in response to transitioning from the normal operating mode to the storage mode, adjust the amount of charge on the lithium battery from an initial charge level which is
 outside the predefined storage range to an adjusted charge level which is within the predefined storage range;
wherein the electric circuitry, when operating the in the normal operating mode, is configured to:
 detect connection of a charger to the utility vehicle, the charger being configured to charge the lithium battery up to the normal charge level while the electronic circuitry is in the normal operating mode.

* * * * *